(12) United States Patent
Imai et al.

(10) Patent No.: US 7,064,504 B2
(45) Date of Patent: Jun. 20, 2006

(54) CONTROL APPARATUS FOR BRUSHLESS DC MOTOR

(75) Inventors: Nobuyuki Imai, Utsunomiya (JP); Yutaka Takahashi, Shioya-gun (JP); Masato Miyauchi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/846,932

(22) Filed: May 17, 2004

(65) Prior Publication Data

US 2005/0029972 A1   Feb. 10, 2005

(30) Foreign Application Priority Data

May 19, 2003   (JP) .............................. 2003-140726

(51) Int. Cl.
*H02P 21/12* (2006.01)
*H02P 21/13* (2006.01)
*H02P 21/00* (2006.01)

(52) U.S. Cl. ...................... 318/254; 318/138; 318/439; 318/798; 318/799; 318/803; 318/805; 318/807; 324/138; 324/545

(58) Field of Classification Search ................ 318/254, 318/138, 439, 807, 798, 799, 803; 324/545, 324/138
See application file for complete search history.

(56) References Cited

U.S. PATENT DOCUMENTS

| 5,144,564 | A | * | 9/1992 | Naidu et al. ................. 318/721 |
| 5,585,709 | A | * | 12/1996 | Jansen et al. ................ 318/807 |
| 6,069,467 | A | * | 5/2000 | Jansen ........................ 318/802 |
| 6,081,093 | A | * | 6/2000 | Oguro et al. ................ 318/807 |
| 6,137,258 | A | * | 10/2000 | Jansen ........................ 318/802 |
| 6,163,128 | A | * | 12/2000 | Hiti et al. .................... 318/722 |
| 6,188,196 | B1 | * | 2/2001 | Koide et al. ................ 318/700 |
| 6,255,798 | B1 | * | 7/2001 | Obara et al. ................ 318/802 |
| 6,320,349 | B1 | * | 11/2001 | Kaneko et al. ............. 318/798 |
| 6,329,781 | B1 | * | 12/2001 | Matsui et al. ............... 318/717 |
| 6,492,788 | B1 | * | 12/2002 | Agirman et al. ............ 318/700 |

(Continued)

OTHER PUBLICATIONS

'93 Motor Technology Symposium, '93 Motor General Session by Matsui, Japan Management Association, Apr. 16, 1993, B4-3-1 to B4-3-10 with English translation thereof. pp. 1-11.

*Primary Examiner*—David Martin
*Assistant Examiner*—Elias B. Hiruy
(74) *Attorney, Agent, or Firm*—Westerman, Hattori, Daniels & Adrian, LLP.

(57) ABSTRACT

A control apparatus for a brushless DC motor that rotatably drives the brushless DC motor including a rotor having a permanent magnet, and a stator having stator windings of a plurality of phases that generate a rotating magnetic field for rotating the rotor, by a current passage switching device constituted by a plurality of switching elements and performing successive commutation of current to the stator windings. The control apparatus includes: an angular error calculation device for calculating a sine value and a cosine value of an angular difference between an estimated rotation angle with respect to the rotation angle of the rotor and an actual rotation angle, based on a line voltage that is a difference between phase voltages of the plurality of phases on an input side of the stator winding and phase currents of the plurality of phases; and an observer for calculating the rotation angle of the rotor based on the sine value and the cosine value of the angular difference.

11 Claims, 14 Drawing Sheets

U.S. PATENT DOCUMENTS

| | | | |
|---|---|---|---|
| 6,577,096 B1* | 6/2003 | Cho | 318/727 |
| 6,707,265 B1* | 3/2004 | Imai et al. | 318/254 |
| 6,838,843 B1* | 1/2005 | Imai et al. | 318/254 |
| 6,841,969 B1* | 1/2005 | Schulz et al. | 318/807 |
| 6,856,109 B1* | 2/2005 | Ho | 318/254 |
| 6,906,491 B1* | 6/2005 | Matsuo et al. | 318/722 |
| 2001/0006335 A1* | 7/2001 | Kondou et al. | 318/727 |
| 2001/0024100 A1* | 9/2001 | Shinnaka | 318/701 |
| 2002/0149335 A1* | 10/2002 | Imai et al. | 318/494 |
| 2003/0030406 A1* | 2/2003 | Takahashi et al. | 318/714 |
| 2003/0102839 A1* | 6/2003 | Kinpara et al. | 318/700 |
| 2004/0032230 A1* | 2/2004 | Schwarz et al. | 318/254 |
| 2004/0061469 A1* | 4/2004 | Imai et al. | 318/494 |
| 2004/0070362 A1* | 4/2004 | Patel et al. | 318/701 |
| 2005/0007044 A1* | 1/2005 | Qiu et al. | 318/254 |
| 2005/0127857 A1* | 6/2005 | Miyauchi | 318/254 |

* cited by examiner

ANGULAR DIFFERENCE ESTIMATED VALUE

FIG. 4

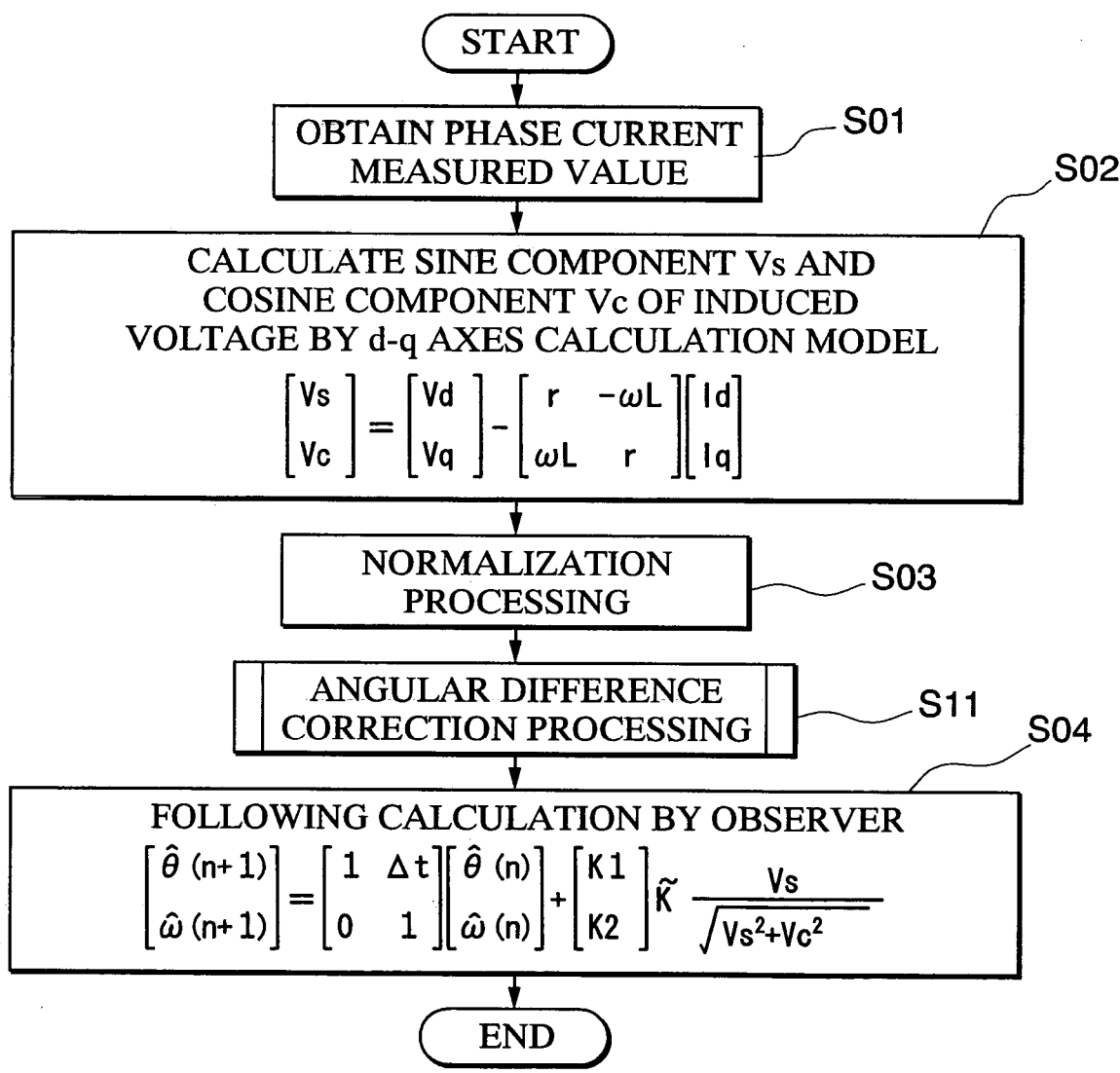

START
↓
OBTAIN PHASE CURRENT MEASURED VALUE — S01
↓
CALCULATE SINE COMPONENT Vs AND COSINE COMPONENT Vc OF INDUCED VOLTAGE BY d-q AXES CALCULATION MODEL $$\begin{bmatrix} V_s \\ V_c \end{bmatrix} = \begin{bmatrix} V_d \\ V_q \end{bmatrix} - \begin{bmatrix} r & -\omega L \\ \omega L & r \end{bmatrix} \begin{bmatrix} I_d \\ I_q \end{bmatrix}$$

— S02
↓
NORMALIZATION PROCESSING — S03
↓
ANGULAR DIFFERENCE CORRECTION PROCESSING — S11
↓
FOLLOWING CALCULATION BY OBSERVER $$\begin{bmatrix} \hat{\theta}(n+1) \\ \hat{\omega}(n+1) \end{bmatrix} = \begin{bmatrix} 1 & \Delta t \\ 0 & 1 \end{bmatrix} \begin{bmatrix} \hat{\theta}(n) \\ \hat{\omega}(n) \end{bmatrix} + \begin{bmatrix} K1 \\ K2 \end{bmatrix} \tilde{K} \frac{V_s}{\sqrt{V_s^2 + V_c^2}}$$

— S04
↓
END

WHEN PHASE CURRENT > 0        WHEN PHASE CURRENT < 0

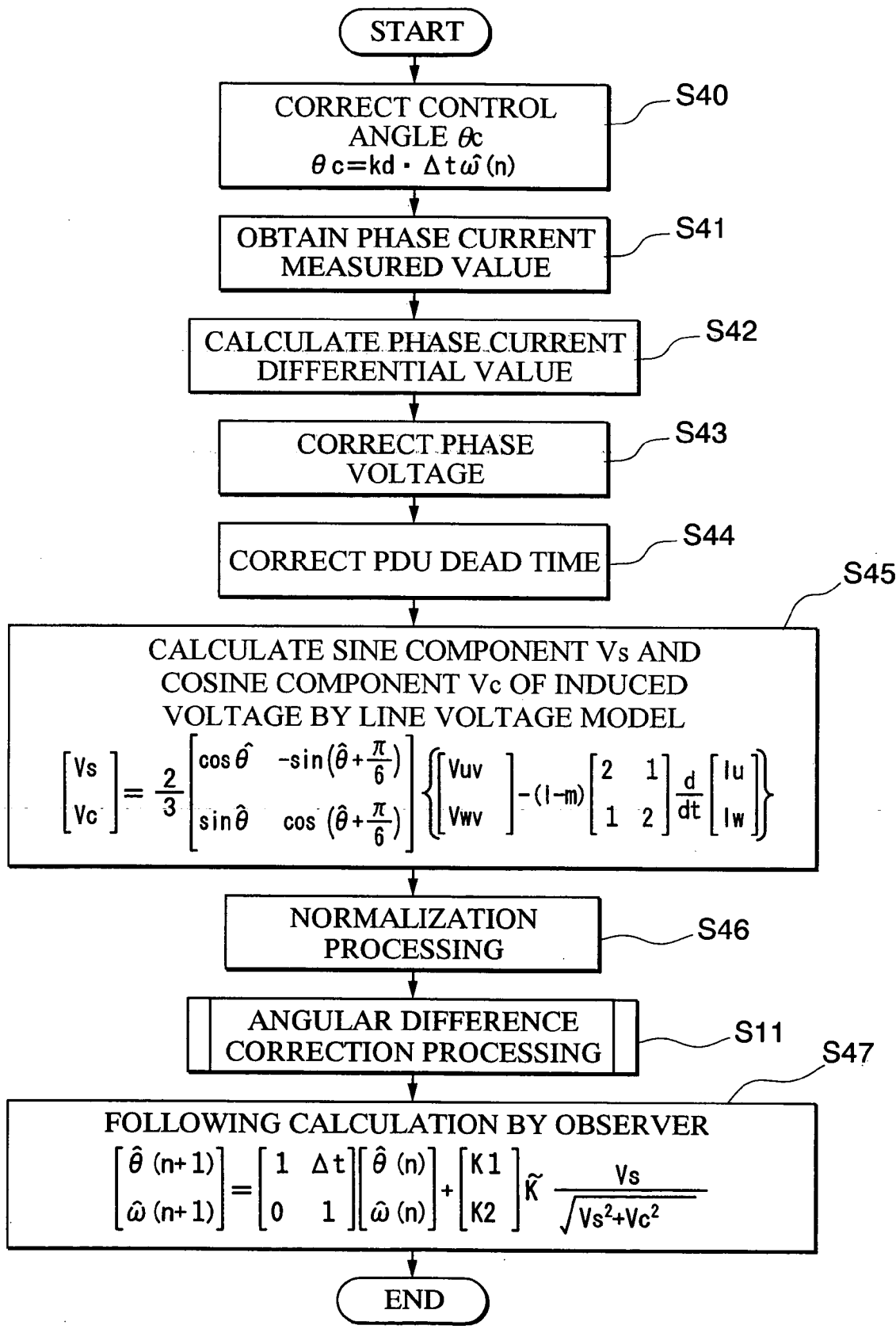

CONTROL APPARATUS FOR BRUSHLESS DC MOTOR

BACKGROUND OF THE INVENTION

1. Field of the Invention

The present invention relates to a control apparatus for a brushless DC motor including a rotor having a permanent magnet, and a stator that generates a rotating magnetic field for rotating the rotor.

Priority is claimed on Japanese Patent Application No. 2003-140726, filed May 19, 2003, the content of which is incorporated herein by reference.

2. Description of the Related Art

Vehicles are known, having a power source for driving a vehicle, including a brushless DC motor using a permanent magnet as a field magnetic, such as fuel cell vehicles, electric vehicles, or hybrid vehicles.

A known control apparatus for such a brushless DC motor is a control apparatus that measures a phase current supplied to each phase of a brushless DC motor, converts a measurement value of the phase current to a d-axis current and a q-axis current on orthogonal coordinates rotating in synchrony with a rotor. For example, d-q coordinates have a direction of a magnetic flux of the rotor in a d-axis (a field axis) and a direction orthogonal to the d-axis in a q-axis (a torque axis), performs feedback control so that a difference between a command value and the measurement value of the current becomes zero on the d-q coordinates.

Specifically, from each difference between the command value and the measurement value on the d-q coordinates, that is, a d-axis current difference and a q-axis current difference, a d-axis voltage command value and a q-axis voltage command value on the d-q coordinates are calculated by a PI action or the like. Then, from the d-axis voltage command value and the q-axis voltage command value, each voltage command value is calculated with respect to a phase voltage supplied to each phase of the brushless DC motor, for example, three phases: a U-phase, a V-phase, and a W-phase. Then, each voltage command value is input as a switching command to an inverter constituted by a switching element such as a transistor, and AC power for driving the brushless DC motor is output from the inverter according to the switching command.

In such a control apparatus, information on an rotation angle of the rotor, that is, a magnetic pole position of the rotor is required in a coordinate conversion processing or the like of the current, and sensorless control is known that omits a position measuring sensor for measuring the rotation angle, and estimates the rotation angle of the rotor based on an induced voltage relating to the magnetic pole position of the rotor (for example, see "'93 Motor Technology Symposium, '93 Motor General Session" by Matsui, Japan Management Association, Apr. 16, 1993, B4-3-1 to B4-3-10").

In the sensorless control of the brushless DC motor according to an example of the related art, first, based on a circuit equation on $\gamma\delta$ coordinates in synchrony with an estimated rotation angle of the rotor having a phase difference $\Delta\theta$ with respect to the d-q coordinates in synchrony with an actual rotation angle of the rotor, the fact that the phase difference $\Delta\theta$ can be approximated by a sine value ($\sin \Delta\theta$) of the phase difference $\Delta\theta$ ($\sin \Delta\theta \approx \Delta\theta$) when the phase difference $\Delta\theta$ is sufficiently small is used to calculate a sine component of an induced voltage including the sine value ($\sin \Delta\theta$) of the phase difference $\Delta\theta$.

Then, a rotational angular velocity of the rotor when the phase difference $\Delta\theta$ is zero is corrected by a value obtained by controlling and amplifying the sine component of the induced voltage by, for example, a PI (proportional integral) action, a value obtained by the correction is set as a rotational angular velocity on the $\gamma\delta$ axes, and then the rotational speed on the $\gamma\delta$ axes is time-integrated to estimate the rotation angle of the rotor.

However, if there is an error in an inductance component value or the like in the circuit equation on the $\gamma\delta$ coordinates that calculates the sine component of the induced voltage, the error in the sine component of the induced voltage increases in proportion to the angular velocity of the rotor. Thus, for the rotation angle of the rotor estimated based on the PI action with respect to the sine component of the induced voltage, a larger revolution speed of the brushless DC motor causes more errors.

Particularly, when the brushless DC motor is included as a drive source of a vehicle, the angular velocity of the rotor often varies significantly, and frequent loss of synchronization impairs traveling of the vehicle.

SUMMARY OF THE INVENTION

The present invention was made in view of the above described circumstances, and has an object to provide a control apparatus for a brushless DC motor capable of improving estimation accuracy when a rotation angle of a rotor is estimated based on an induced voltage in position sensorless control of the brushless DC motor.

In order to solve the above described problems and achieve the object, the present invention provides a control apparatus for a brushless DC motor that rotatably drives the brushless DC motor including a rotor having a permanent magnet, and a stator having stator windings of a plurality of phases that generate a rotating magnetic field for rotating the rotor, by a current passage switching device constituted by a plurality of switching elements and performing successive commutation of current to the stator windings, the control apparatus including: an angular error calculation device for calculating a sine value and a cosine value of an angular difference between an estimated rotation angle with respect to the rotation angle of the rotor and an actual rotation angle, based on a line voltage that is a difference between phase voltages of the plurality of phases on an input side of the stator winding and phase currents of the plurality of phases; and an observer for calculating the rotation angle of the rotor based on the sine value and the cosine value of the angular difference.

According to the control apparatus for a brushless DC motor configured as described above, the angular error calculation device calculates a phase angle of an induced voltage relating to a magnetic pole position of the rotor, that is, the sine value and the cosine value of the angular difference between the estimated rotation angle with respect to the rotation angle of the rotor and the actual rotation angle, by a line voltage model based on the line voltage that is the difference between the phase voltages of the plurality of phases on the input side of the stator winding and the phase currents of the plurality of phases.

The observer uses, for example, the rotation angle and an angular velocity of the rotor calculated in the former processing as calculation parameters based on the sine value and the cosine value of the angular difference calculated by the angular error calculation device, performs a following calculation processing so as to converge the angular difference between the estimated rotation angle and the actual rotation angle calculated in the former processing to zero, and successively updates the calculation parameters for calculation.

Thus, using the line voltage model allows the estimated rotation angle to be estimated with high accuracy regardless of a current waveform of the phase current and a voltage waveform of the phase voltage, for example, even if the current waveform and the voltage waveform are deformed from sine waves or are not sine waves. Furthermore, a current waveform of an appropriate sine wave allows the estimated rotation angle to be estimated with high accuracy regardless of whether the brushless DC motor has saliency, that is, even if the brushless DC motor has saliency.

In the above control apparatus for a brushless DC motor, the angular error calculation device may calculate a sine component and a cosine component of an induced voltage constituted by the sine value and the cosine value of the angular difference, and the angular error calculation device may include: an angular velocity state function calculation device for calculating a state function in proportion to an angular velocity of the rotor based on the sine component and the cosine component of the induced voltage; and a normalization device for dividing the sine component of the induced voltage by the state function in proportion to the angular velocity of the rotor.

According to the control apparatus for a brushless DC motor configured as described above, the normalization device divides the sine component of the induced voltage calculated in the angular error calculation device by the state function in proportion to the angular velocity of the rotor calculated in the angular velocity state function calculation device, and inputs a value obtained by the division to the observer as an input value to the following calculation processing in the observer.

Specifically, the observer performs the following calculation processing so as to converge the angular difference between the estimated rotation angle and the actual rotation angle to zero, and the angular difference or a value relating to the angular difference is input to the observer as the input value. If the angular difference is sufficiently small, the value of the angular difference can be approximated by the sine value of the angular difference, and thus the angular error calculation device calculates the sine component of the induced voltage including the sine value of the angular difference based on the line voltage model, and inputs the sine component to the observer.

If there is an error in an inductance component value or the like used in the line voltage model, the error in the sine component of the induced voltage increases in proportion to the angular velocity of the rotor. Thus, dividing the sine component of the induced voltage by the state function in proportion to the angular velocity of the rotor causes the error in the input value to the following calculation processing in the observer to be independent of the angular velocity of the rotor, thus allowing the estimated rotation angle to be estimated with high accuracy.

In the above control apparatus for a brushless DC motor, the angular error calculation device may calculate the sine component and the cosine component of the induced voltage constituted by the sine value and the cosine value of the angular difference, and the angular error calculation device may include: a revolution speed measuring device for measuring the revolution speed of the brushless DC motor; an angular velocity calculation device for calculating the angular velocity of the rotor based on the revolution speed of the brushless DC motor; and a normalization device for dividing the sine component of the induced voltage by the angular velocity of the rotor.

According to the control apparatus for a brushless DC motor configured as described above, the normalization device divides the sine component of the induced voltage used in the angular error calculation device by the angular velocity of the rotor measured by the revolution speed measuring device, and inputs a value obtained by the division to the observer as an input value to the following calculation processing in the observer.

This causes the error in the input value to the following calculation processing in the observer to be independent of the angular velocity of the rotor, thus allowing the estimated rotation angle to be estimated with high accuracy.

For example, when the brushless DC motor is included in a hybrid vehicle as a drive source together with an internal combustion engine, the revolution speed measuring device can measure the angular velocity of the rotor based on an output from the engine revolution speed sensor that measures the revolution speed of the internal combustion engine, thus allowing the device configuration to be simplified.

In the above control apparatus for a brushless DC motor, the angular error calculation device may calculate the sine component and the cosine component of the induced voltage constituted by the sine value and the cosine value of the angular difference, and the angular error calculation device may include: a coefficient acting device for causing a predetermined coefficient according to the estimated rotation angle to act on the sine component and the cosine component of the induced voltage; and a phase current differential value calculation device for calculating a differential value of the phase current, and the sine value and the cosine value of the angular difference is calculated based on Formula (2), $$\frac{2}{3}\begin{bmatrix} \cos\hat{\theta} & -\sin(\hat{\theta}+\frac{\pi}{6}) \\ \sin\hat{\theta} & \cos(\hat{\theta}+\frac{\pi}{6}) \end{bmatrix}$$

$$\left\{ \begin{bmatrix} V_1 \\ V_2 \end{bmatrix} - r\begin{bmatrix} 2 & 1 \\ 1 & 2 \end{bmatrix}\begin{bmatrix} I_1 \\ I_2 \end{bmatrix} - (l-m)\begin{bmatrix} 2 & 1 \\ 1 & 2 \end{bmatrix}\frac{d}{dt}\begin{bmatrix} I_1 \\ I_2 \end{bmatrix} \right\} \approx$$

$$\omega Ke\begin{bmatrix} \sin\theta e \\ \cos\theta e \end{bmatrix} \equiv \begin{bmatrix} Vs \\ Vc \end{bmatrix}$$

(2)

where r is a phase resistance; $V_1$, a first line voltage; $V_2$; a second line voltage; $I_1$, a first phase current; $I_2$, a second phase current; l, a self inductance; m, a mutual inductance; $\hat{\theta}$, an estimated rotation angle; $\theta e$, an angular difference between the estimated rotation angle and an actual rotation angle; $\omega$, a rotational angular velocity of the rotor; Ke, an induced voltage constant; Vs, a sine component of the induced voltage; and Vc; a cosine component of the induced voltage.

According to the control apparatus for a brushless DC motor configured as described above, using Formula (2) relating to the line voltage model allows the estimated rotation angle to be estimated with high accuracy regardless of a current waveform of the phase current and a voltage waveform of the phase voltage, for example, even if the current waveform and the voltage waveform are deformed from sine waves or are not sine waves. Furthermore, a current waveform of an appropriate sine wave allows the estimated rotation angle to be estimated with high accuracy regardless of whether the brushless DC motor has saliency, that is, even if the brushless DC motor has saliency.

In the above control apparatus for a brushless DC motor, the phase current differential value calculation device may calculate, by a least squares method, variations of current measured values per unit time at past predetermined times with respect to at least three of the current measured values of the phase currents that form time-series data, and the phase current differential value calculation device may include: a phase voltage correction device for correcting a time delay relating to the past predetermined times with respect to the phase voltages of the plurality of phases for calculating the line voltage; and a control angle correction device for correcting a time delay relating to an appropriate past time with respect to a control angle relating to the rotation angle of the rotor used when the phase currents of the plurality of phases are converted to a d-axis current and a q-axis current on d-q coordinates that form rotating orthogonal coordinates, and feedback control is performed so that a difference between a command value and a measured value of each current on the d-q coordinates becomes zero.

According to the control apparatus for a brushless DC motor configured as described above, the phase current differential value calculation device calculates a current differential value from the plurality of current measured values that form the time-series data, and thus the calculated current differential value becomes a value at the past predetermined time. Correcting the phase voltage for calculating the line voltage and the control angle used in a feedback processing of the current corresponding to the time delay allows the estimated rotation angle to be estimated with high accuracy.

In the above control apparatus for a brushless DC motor, the current passage switching device may include a bridge circuit with the plurality of switching elements connected by bridges, and the control apparatus may further include a dead time correction device for correcting the phase voltages of the plurality of phases for calculating the line voltage, based on a dead time in which two of the switching elements connected in series for each phase in the bridge circuit are set to an off state, and polarities of the phase currents.

According to the control apparatus for a brushless DC motor configured as described above, the magnitude of an output voltage of the current passage switching device varies according to the length of the dead time of the current passage switching device, positive or negative polarities of the phase currents, and a power supply voltage supplied to the current passage switching device, and the phase of the induced voltage varies as the output voltage varies. Thus, correcting the dead time with respect to the phase voltages with the plurality of phases for calculating the line voltage allows the estimated rotation angle to be estimated with high accuracy.

In the above control apparatus for a brushless DC motor, the observer may include an angular difference correction device for correcting the angular difference when the cosine value of the angular difference is negative.

According to the control apparatus for a brushless DC motor configured as described above, when the sine component of the induced voltage including the sine value of the angular difference is input as the input value to the following calculation processing in the observer, the angular difference is sufficiently small, and the value of the angular difference can be approximated by the sine value of the angular difference. Thus, for example, when the cosine value of the angular difference is negative, that is, when an absolute value of the angular difference is larger than $\pi/2$, correcting the value of the angular difference approximated by the sine value of the angular difference allows the estimated rotation angle to be estimated with high accuracy.

In the above control apparatus for a brushless DC motor, the observer may include an angular difference correction device for correcting the angular difference according to a magnitude relation of absolute values of the sine value and the cosine value of the angular difference.

According to the control apparatus for a brushless DC motor configured as described above, when the sine component of the induced voltage including the sine value of the angular difference is input as the input value to the following calculation processing in the observer, the angular difference is sufficiently small, and the angular difference can be approximated by the sine value of the angular difference. Thus, for example, when the sine value of the angular difference is larger than the cosine value of the angular difference, that is, when the absolute value of the angular difference is larger than $\pi/4$, correcting the value of the angular difference approximated by the sine value of the angular difference allows the estimated rotation angle to be estimated with high accuracy.

The present invention further provides a control apparatus for a brushless DC motor that rotatably drives the brushless DC motor including a rotor having a permanent magnet, and a stator having stator windings of a plurality of phases that generate a rotating magnetic field for rotating the rotor, by a current passage switching device constituted by a plurality of switching elements and performing successive commutation of current to the stator windings, according to voltages of a plurality of phases converted from two phase voltages constituted by a d-axis voltage and a q-axis voltage. The present invention includes: an angular error calculation device for calculating a sine component and a cosine component of an induced voltage constituted by a sine value and a cosine value of an angular difference between an estimated rotation angle with respect to a rotation angle of the rotor and an actual rotation angle, by a d-q axes calculation model that describes a state of the brushless DC motor based on the d-axis voltage and the q-axis voltage, an inductance component value, and a d-axis current and a q-axis current; a normalization device for dividing the sine component of the induced voltage by a state function in proportion to an angular velocity of the rotor calculated based on the sine component and the cosine component of the induced voltage, or by an angular velocity of the rotor calculated based on a measured value of the revolution speed of the brushless DC motor; and an observer for calculating the rotation angle of the rotor based on the sine value and the cosine value of the angular difference.

According to the control apparatus for a brushless DC motor configured as described above, the normalization device divides the sine component of the induced voltage calculated in the angular error calculation device by the angular velocity of the rotor or the state function in proportion to the angular velocity of the rotor, and inputs a value obtained by the division to the observer as an input value to a following calculation processing in the observer.

Specifically, the observer performs the following calculation processing so as to converge the angular difference between the estimated rotation angle and the actual rotation angle to zero, and the angular difference or a value relating to the angular difference is input to the observer as the input value. If the angular difference is sufficiently small, the value of the angular difference can be approximated by the sine value of the angular difference, and thus the angular error calculation device calculates the sine component of the induced voltage including the sine value of the angular difference based on the d-q axes calculation model, and inputs the sine component to the observer.

If there is an error in an inductance component value or the like used in the d-q axes calculation model, the error in the sine component of the induced voltage increases in proportion to the angular velocity of the rotor. Thus, dividing the sine component of the induced voltage by the angular velocity of the rotor or the state function in proportion to the angular velocity of the rotor causes the error in the input value to the following calculation processing in the observer to be independent of the angular velocity of the rotor, thus allowing the estimated rotation angle to be estimated with high accuracy.

The present invention further provides a control method for a brushless DC motor that rotatably drives the brushless DC motor including a rotor having a permanent magnet, and a stator having stator windings of a plurality of phases that generate a rotating magnetic field for rotating the rotor. The control method of the present invention includes the steps of: rotating the DC motor by a current passage switching device constituted by a plurality of switching elements and performing successive commutation of current to the stator windings; calculating, by an angular error calculation device, a sine value and a cosine value of an angular difference between an estimated rotation angle with respect to the rotation angle of the rotor and an actual rotation angle, based on a line voltage that is a difference between phase voltages of the plurality of phases on an input side of the stator winding and phase currents of the plurality of phases; and calculating, by an observer, the rotation angle of the rotor based on the sine value and the cosine value of the angular difference.

According to the above control method for a brushless DC motor, the angular error calculation device calculates a phase angle of an induced voltage relating to a magnetic pole position of the rotor, that is, the sine value and the cosine value of the angular difference between the estimated rotation angle with respect to the rotation angle of the rotor and the actual rotation angle, by a line voltage model based on the line voltage that is the difference between the phase voltages of the plurality of phases on the input side of the stator winding and the phase currents of the plurality of phases.

The observer uses, for example, the rotation angle and an angular velocity of the rotor calculated in the former processing as calculation parameters based on the sine value and the cosine value of the angular difference calculated by the angular error calculation device, performs a following calculation processing so as to converge the angular difference between the estimated rotation angle and the actual rotation angle calculated in the former processing to zero, and successively updates the calculation parameters for calculation.

Thus, using the line voltage model allows the estimated rotation angle to be estimated with high accuracy regardless of a current waveform of the phase current and a voltage waveform of the phase voltage, for example, even if the current waveform and the voltage waveform are deformed from sine waves or are not sine waves. Furthermore, a current waveform of an appropriate sine wave allows the estimated rotation angle to be estimated with high accuracy regardless of whether the brushless DC motor has saliency, that is, even if the brushless DC motor has saliency.

The above control method for a brushless DC motor may further include the steps of: calculating, by the angular error calculation device, a sine component and a cosine component of an induced voltage constituted by the sine value and the cosine value of the angular difference; calculating, by an angular velocity state function calculation device, a state function in proportion to an angular velocity of the rotor based on the sine component and the cosine component of the induced voltage; and dividing, by a normalization device, the sine component of the induced voltage by the state function in proportion to the angular velocity of the rotor so as to be normalized.

According to the above control method for a brushless DC motor, the normalization device divides the sine component of the induced voltage calculated in the angular error calculation device by the state function in proportion to the angular velocity of the rotor calculated in the angular velocity state function calculation device, and inputs a value obtained by the division to the observer as an input value to the following calculation processing in the observer.

Specifically, the observer performs the following calculation processing so as to converge the angular difference between the estimated rotation angle and the actual rotation angle to zero, and the angular difference or a value relating to the angular difference is input to the observer as the input value. If the angular difference is sufficiently small, the value of the angular difference can be approximated by the sine value of the angular difference, and thus the angular error calculation device calculates the sine component of the induced voltage including the sine value of the angular difference based on the line voltage model, and inputs the sine component to the observer.

If there is an error in an inductance component value or the like used in the line voltage model, the error in the sine component of the induced voltage increases in proportion to the angular velocity of the rotor. Thus, dividing the sine component of the induced voltage by the state function in proportion to the angular velocity of the rotor causes the error in the input value to the following calculation processing in the observer to be independent of the angular velocity of the rotor, thus allowing the estimated rotation angle to be estimated with high accuracy.

The above control method for a brushless DC motor may further include the steps of: calculating a sine component and a cosine component of an induced voltage constituted by the sine value and the cosine value of the angular difference; measuring the revolution speed of the brushless DC motor; calculating the angular velocity of the rotor based on the revolution speed of the brushless DC motor; and dividing the sine component of the induced voltage by the state function in proportion to the angular velocity of the rotor so as to be normalized.

According to the above control method for a brushless DC motor, the normalization device divides the sine component of the induced voltage used in the angular error calculation device by the angular velocity of the rotor measured by the revolution speed measuring device, and inputs a value obtained by the division to the observer as an input value to the following calculation processing in the observer.

This causes the error in the input value to the following calculation processing in the observer to be independent of the angular velocity of the rotor, thus allowing the estimated rotation angle to be estimated with high accuracy.

For example, when the brushless DC motor is included in a hybrid vehicle as a drive source together with an internal combustion engine, the revolution speed measuring device can measure the angular velocity of the rotor based on an output from the engine revolution speed sensor that measures the revolution speed of the internal combustion engine, thus allowing the device configuration to be simplified.

The present invention further provides a control method for a brushless DC motor that rotatably drives the brushless DC motor including a rotor having a permanent magnet, and a stator having stator windings of a plurality of phases that generate a rotating magnetic field for rotating the rotor. The control method includes the steps of: rotating the DC motor by a current passage switching device constituted by a plurality of switching elements and performing successive commutation of current to the stator windings, according to voltages of a plurality of phases converted from two phase voltages constituted by a d-axis voltage and a q-axis voltage; calculating, by an angular error calculation device, a sine component and a cosine component of an induced voltage constituted by a sine value and a cosine value of an angular difference between an estimated rotation angle with respect to a rotation angle of the rotor and an actual rotation angle, by a d-q axes calculation model that describes a state of the brushless DC motor based on the d-axis voltage and the q-axis voltage, an inductance component value, and a d-axis current and a q-axis current; dividing, by a normalization device, the sine component of the induced voltage by a state function in proportion to an angular velocity of the rotor calculated based on the sine component and the cosine component of the induced voltage, or by an angular velocity of the rotor calculated based on a measured value of the revolution speed of the brushless DC motor so as to be normalized; and calculating, by an observer, the rotation angle of the rotor based on the sine value and the cosine value of the angular difference.

According to the above control method for a brushless DC motor, the normalization device divides the sine component of the induced voltage calculated in the angular error calculation device by the state function in proportion to the angular velocity of the rotor calculated in the angular velocity state function calculation device, and inputs a value obtained by the division to the observer as an input value to the following calculation processing in the observer.

Specifically, the observer performs the following calculation processing so as to converge the angular difference between the estimated rotation angle and the actual rotation angle to zero, and the angular difference or a value relating to the angular difference is input to the observer as the input value. If the angular difference is sufficiently small, the value of the angular difference can be approximated by the sine value of the angular difference, and thus the angular error calculation device calculates the sine component of the induced voltage including the sine value of the angular difference based on the d-q axes calculation model, and inputs the sine component to the observer.

If there is an error in an inductance component value or the like used in the d-q axes calculation model, the error in the sine component of the induced voltage increases in proportion to the angular velocity of the rotor. Thus, dividing the sine component of the induced voltage by the state function in proportion to the angular velocity of the rotor causes the error in the input value to the following calculation processing in the observer to be independent of the angular velocity of the rotor, thus allowing the estimated rotation angle to be estimated with high accuracy.

The above control method for a brushless DC motor may further include a step of: correcting the angular difference when the cosine value of the angular difference is negative.

According to the above control method for a brushless DC motor, when the sine component of the induced voltage including the sine value of the angular difference is input as the input value to the following calculation processing in the observer, the angular difference is sufficiently small, and the value of the angular difference can be approximated by the sine value of the angular difference. Thus, for example, when the cosine value of the angular difference is negative, that is, when an absolute value of the angular difference is larger than $\pi/2$, correcting the value of the angular difference approximated by the sine value of the angular difference allows the estimated rotation angle to be estimated with high accuracy.

The above control method for a brushless DC motor may further include a step of: correcting the angular difference according to a magnitude relation of absolute values of the sine value and the cosine value of the angular difference.

According to the above control method for a brushless DC motor, when the sine component of the induced voltage including the sine value of the angular difference is input as the input value to the following calculation processing in the observer, the angular difference is sufficiently small, and the angular difference can be approximated by the sine value of the angular difference. Thus, for example, when the sine value of the angular difference is larger than the cosine value of the angular difference, that is, when the absolute value of the angular difference is larger than $\pi/4$, correcting the value of the angular difference approximated by the sine value of the angular difference allows the estimated rotation angle to be estimated with high accuracy.

The aforementioned angular error calculation device, observer, angular velocity state function calculation device, normalization device, coefficient acting device, phase current differential value calculation device, dead time correction device constituting the phase current differential value calculation device, and angular difference correction device can be integrated and realized in the form of executing programs in a micro-computer or in micro-computers.

BRIEF DESCRIPTION OF THE DRAWINGS

FIG. 4 is a flowchart of operations of a control apparatus for a brushless DC motor according to a second variation of the first embodiment;

FIG. 16 is a flowchart of operations of a control apparatus for a brushless DC motor according to a second variation of the second embodiment;

DETAILED DESCRIPTION OF THE PREFERRED EMBODIMENTS

Figure 1:
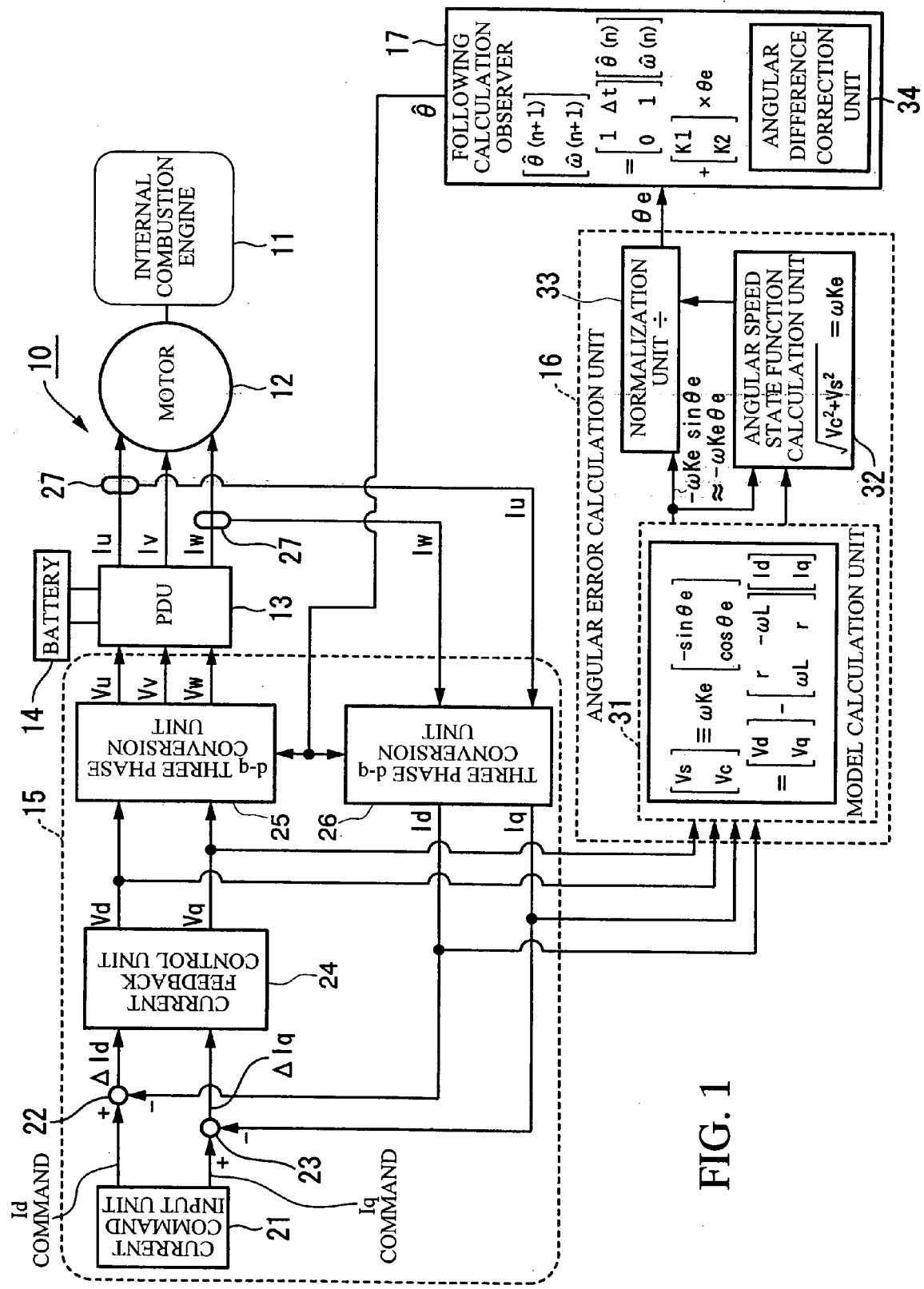
FIG. 1 shows a configuration of a control apparatus for a brushless DC motor according to a first embodiment of the invention.

Now, a first embodiment of a control apparatus for a brushless DC motor according to the invention will be described with reference to the accompanying drawings.

The control apparatus for a brushless DC motor 10 (hereinafter simply referred to as the motor control apparatus 10) according to the first embodiment drives and controls a brushless DC motor 12 (hereinafter simply referred to as the motor 12) included in, for example, a hybrid vehicle as a drive source together with an internal combustion engine 11. The motor 12 includes a rotor (not shown) connected in series to the internal combustion engine 11 and having a permanent magnet used as a field, and a stator (not shown) that generates a rotating magnetic field for rotating the rotor.

The motor control apparatus 10 includes, as shown in FIG. 1, a power drive unit (PDU) 13, a battery 14, a control unit 15, an angular error calculation unit 16, and an observer 17.

In the motor control apparatus 10, a drive and a regenerative operation of the motor 12 having a plurality of phases (for example, three phases: a U-phase; a V-phase; and a W-phase) are performed by the power drive unit (PDU) 13 that receives a control command output from the control unit 15.

The PDU 13 includes, for example, a PWM inverter by pulse width modulation (PWM) having a bridge circuit with a plurality of switching elements of a transistor connected by bridges, and a high voltage battery 14 for supplying and receiving electric energy to and from the motor 12 is connected to the PDU 13.

When driving the motor 12, the PDU 13 converts DC power supplied from the battery 14 to three-phase AC power based on command values (a U-phase AC voltage command value Vu, a V-phase AC voltage command value Vv, a W-phase AC voltage command value Vw) output from the control unit 15, performs successive commutation of current to a stator winding of the three-phase motor 12, and thus outputs a U-phase current Iu, a V-phase current Iv, and a W-phase current Iw corresponding to the voltage command values Vu, Vv and Vw to the phases of the motor 12.

The control unit 15 performs feedback control of current on d-q coordinates that form rotating orthogonal coordinates, calculates the voltage command values Vu, Vv and Vw based on an Id command and an Iq command, inputs pulse width modulation signals to the PDU 13, and controls so that each difference becomes zero between a d-axis current Id and a q-axis current Iq and the Id command and the Iq command, respectively, obtained by converting the phase currents Iu, Iv and Iw actually supplied from the PDU 13 to the motor 12 on the d-q coordinates.

The control unit 15 includes, for example, a current command input unit 21, subtracters 22 and 23, a current feedback control unit 24, a dq-three phase conversion unit 25, and a three phase-dq conversion unit 26.

The current command input unit 21 calculates a current command for specifying the phase currents Iu, Iv and Iw supplied from the PDU 13 to the motor 12 based on a torque command value for causing the motor 12 to generate a torque value required according to the amount of acceleration operation relating to driver's depression of an accelerator pedal and the revolution speed of the motor 12, and the current command is output to the subtracters 22 and 23 as the Id command and the Iq command on the rotating orthogonal coordinates.

The d-q coordinates that form the rotating orthogonal coordinates sets, for example, a direction of a magnetic flux of a field pole by the permanent magnet of the rotor in a d-axis (a field axis) and sets a direction orthogonal to the d-axis in a q-axis (a torque axis), and rotates at an electrical angular velocity ω (hereinafter simply referred to as the rotational angular velocity ω) in synchrony with the rotor (not shown) of the motor 12. Thus, the Id command and the Iq command that are DC signals are provided as current commands to AC signals supplied from the PDU 13 to the phases of the motor 12

The subtracter 22 calculates a difference ΔId between the Id command and the d-axis current Id, and the subtracter 23 calculates a difference ΔIq between the Iq command and the q-axis current Iq. The differences ΔId and ΔIq output from the subtracters 22 and 23 are input to the current feedback control unit 24.

The current feedback control unit 24 controls and amplifies the difference ΔId to calculate a d-axis voltage command value Vd, and controls and amplifies the difference ΔIq to calculate a q-axis voltage command value Vq by a PI (proportional plus integral) action. The d-axis voltage command value Vd and the q-axis voltage command value Vq output from the current feedback control unit 24 are input to the dq-three phase conversion unit 25.

The dq-three phase conversion unit 25 uses an estimated rotation angle θ^ with respect to a rotation angle of the rotor input from a below described observer 17 to convert the d-axis voltage command value Vd and the q-axis voltage command value Vq on the d-q coordinates to a U-phase AC voltage command value Vu, a V-phase AC voltage command value Vv, and W-phase AC voltage command value Vw on three-phase AC coordinates that are static coordinates.

The voltage command values Vu, Vv and Vw output from the dq-three phase conversion unit 25 are input to the PDU 13 as switching commands (for example, pulse width modulation signals) for turning on/off the switching elements of the PDU 13.

The three phase-dq conversion unit 26 uses the estimated rotation angle θ^ with respect to the rotation angle of the rotor input from the below described observer 17 to convert the phase currents Iu, Iv and Iw on the static coordinates to the d-axis current Id and the q-axis current Iq on the rotating coordinates by rotational phases of the motor 12, that is, the d-q coordinates. Thus, measured values (for example, a U-phase current Iu and a W-phase current Iw) output from at least two phase current detectors 27 and 27 for detecting the phase currents Iu, Iv and Iw supplied to the stator windings of the phases of the motor 12 are input to the three phase-dq conversion unit 26. Then, the d-axis current Id and the q-axis current Iq output from the three phase-dq conversion unit 26 are output to the subtracters 22 and 23.

The angular error calculation unit 16 uses the fact that an angular difference $\theta e$ can be approximated by a sine value $\sin \theta e$ ($\theta e \approx \sin \theta e$) when the angular difference $\theta e$ ($=\theta-\theta\hat{\ }$) between the estimated rotation angle $\theta\hat{\ }$ with respect to the rotation angle of the rotor and an actual rotation angle $\theta$ is relatively small to calculate the angular difference $\theta e$ based on the sine value $\sin \theta e$ and a cosine value $\cos \theta e$ of the angular difference $\theta e$ included in a circuit equation by, for example, a d-q axes calculation model, and output the angular difference $\theta e$ to the observer 17.

The angular error calculation unit 16 includes, for example, a model calculation unit 31, an angular velocity state function calculation unit 32, and a normalization unit 33.

The model calculation unit 31 calculates a sine component Vs and a cosine component Vc of an induced voltage constituted by the sine value $\sin \theta e$ and the cosine value $\cos \theta e$ of the angular difference $\theta e$ by a circuit equation on the d-q coordinates expressed as in Formula (3), based on the d-axis voltage command value Vd and the q-axis voltage command value Vq output from the current feedback control unit 24 and the d-axis current Id and the q-axis current Iq output from the three phase-dq conversion unit 26. In Formula (3), $\omega$ is a rotational angular velocity of the rotor, Ke is an induced voltage constant, r is a phase resistance, and L is an inductance component value.

$$\begin{bmatrix} Vs \\ Vc \end{bmatrix} \equiv \omega Ke \begin{bmatrix} -\sin\theta e \\ \cos\theta e \end{bmatrix} = \begin{bmatrix} Vd \\ Vq \end{bmatrix} - \begin{bmatrix} r & -\omega L \\ \omega L & r \end{bmatrix} \begin{bmatrix} Id \\ Iq \end{bmatrix} \quad (3)$$

The angular velocity state function calculation unit 32 calculates, as expressed in Formula (4), a value ($\omega Ke$) obtained by multiplying the rotational angular velocity $\omega$ by the induced voltage constant Ke as a state function in proportion to the rotational angular velocity $\omega$ used in a below described normalization processing in the normalization unit 33, based on the sine component Vs and the cosine component Vc of the induced voltage calculated in the model calculation unit 31, and outputs the value to the normalization unit 33.

$$\sqrt{Vc^2+Vs^2}=\omega Ke \quad (4)$$

The normalization unit 33 calculates an angular difference approximate value ($-Vs/(Vs^2+Vc^2)^{1/2} \approx \theta e$) approximated by the angular difference $\theta e$ by dividing the sine component Vs of the induced voltage calculated in the model calculation unit 31 by the state function (for example, $\omega Ke$) in proportion to the rotational angular velocity $\omega$ calculated in the angular velocity state function calculation unit 32, and inputs the value to the observer 17.

Specifically, if an angular difference estimated value $\theta es$ is set as a value obtained by multiplying the angular difference $\theta e$ by the rotational angular velocity $\omega$ and the induced voltage constant Ke, the angular difference estimated value $\theta es$ is expressed as in Formula (5) so that the sine value $\sin \theta e$ is approximated by the angular difference $\theta e$ ($\theta e \approx \sin \theta e$) in the sine component Vs of the induced voltage in Formula (3), and that voltage drop by the phase resistance r is ignored.

$$\theta es = -\omega Ke\theta e \approx -\omega Ke\sin\theta e \quad (5)$$
$$= Vd - rId + \omega LIq \approx Vd + \omega LIq$$

In Formula (5), if there is an error $\Delta L$, for example, in the inductance component value L, the angular difference estimated value $\theta es$ is expressed as in Formula (6), and even if the angular difference $\theta e$ is constant, the error increases in proportion to the rotational angular velocity $\omega$.

Figure 2:
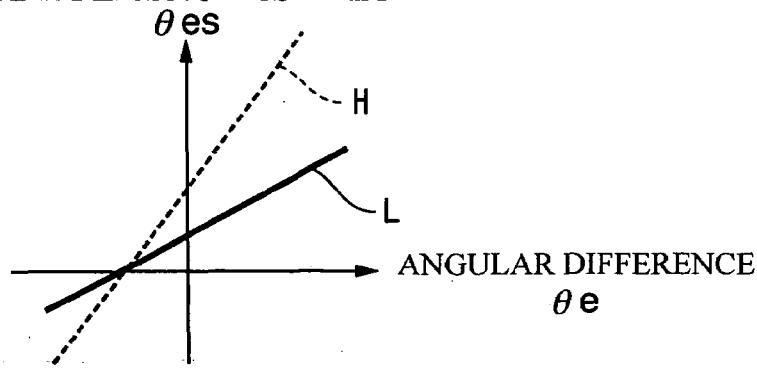
FIG. 2 is a graph of an example of a relationship between an angular difference $\theta e$ and an angular difference estimated value $\theta es$ according to a rotational state of the motor.

Specifically, in Formula (6), the term including the error $\Delta L$ ($\omega L Iq$) indicates an error in the angular difference estimated value $\theta es$ when the angular difference $\theta e$ is zero, and increases in proportion to the rotational angular velocity $\omega$. Thus, as shown in FIG. 2, in a relatively high rotational state of the motor 12 (for example, the dotted line H in FIG. 2), the error in the angular difference estimated value $\theta es$ increases more than in a relatively low rotational state of the motor 12 (for example, the solid line L in FIG. 2).

$$\theta es = Vd + \omega(L + \Delta L)Iq \quad (6)$$
$$= -\omega Ke\sin\theta e + \omega\Delta LIq \approx -\omega Ke\theta + \omega\Delta LIq$$

When the angular difference estimated value $\theta es$ by Formula (6) is divided by a value $\omega K$ (K is any constant) in proportion to the rotational angular velocity $\omega$, the error in the angular difference estimated value $\theta es$ becomes independent of the rotational angular velocity $\omega$ as shown in Formula (7).

$$\frac{\theta es}{\omega K} = \frac{\omega Ke\sin\theta e + \omega\Delta LI}{\omega K} \approx \frac{Ke}{K}\theta e + \frac{\Delta LI}{K} \quad (7)$$

Thus, the observer 17 sets the value $(Vs/(Vs2+Vc2)^{1/2})$ obtained by dividing the sine component Vs of the induced voltage approximated by the angular difference estimated value $\theta es$ as expressed in Formula (5) by the state function (for example, $\omega Ke$) in proportion to the rotational angular velocity $\omega$ calculated in the angular velocity state function calculation unit 32 as expressed in Formula (4), that is, the angular difference approximate value $(-Vs/(Vs2+Vc2)^{1/2} \approx \theta e)$ approximated by the angular difference $\theta e$, as an input value to a following calculation processing. Then, the observer 17 performs the following calculation processing so as to converge the input value (that is, the angular difference $\theta e$) to zero as expressed in Formula (8), successively updates the estimated rotation angle $\theta\hat{\ }$ for calculation, and outputs a convergence value of the estimated rotation angle $\theta\hat{\ }$ to the dq-three phase conversion unit 25 and the three phase-dq conversion unit 26 of the control unit 15.

In Formula (8), n is any counting number indicating the number of performance of the following calculation processing repeated at a predetermined time interval $\Delta t$, K1 is a control gain (feedback gain) relating to the estimated rotation angle $\theta\hat{\ }$, K2 is a control gain (feedback gain)

relating to a rotational angular velocity estimated value $\hat{\omega}$, and $\tilde{K}$ is an appropriate proportional coefficient including positive and negative signs.

In Formula (8), "offset" is a rotation angle of the rotor set in the relatively low rotational state of the motor 12 or in calculation of the actual rotation angle $\theta$.

$$\begin{bmatrix} \hat{\theta} & (n+1) \\ \hat{\omega} & (n+1) \end{bmatrix} = \begin{bmatrix} 1 & \Delta t \\ 0 & 1 \end{bmatrix} \begin{bmatrix} \hat{\theta} & (n) \\ \hat{\omega} & (n) \end{bmatrix} + \begin{bmatrix} K1 \\ K2 \end{bmatrix} \tilde{K} \frac{Vs}{\sqrt{Vs^2 + Vc^2}} \quad (8)$$

$$\approx \begin{bmatrix} 1 & \Delta t \\ 0 & 1 \end{bmatrix} \begin{bmatrix} \hat{\theta} & (n) \\ \hat{\omega} & (n) \end{bmatrix} + \begin{bmatrix} K1 \\ K2 \end{bmatrix} \tilde{K}(\theta e(n) + \text{offset}),$$

$$(\theta e(n) \approx 0)$$

The motor control apparatus 10 according to the first embodiment has the above described configuration, and now, operations of the motor control apparatus 10, more particularly, a calculation processing of the estimated rotation angle $\hat{\theta}$ in sensorless control by the d-q axes calculation model will be described with reference to the accompanying drawings.

Figure 3:
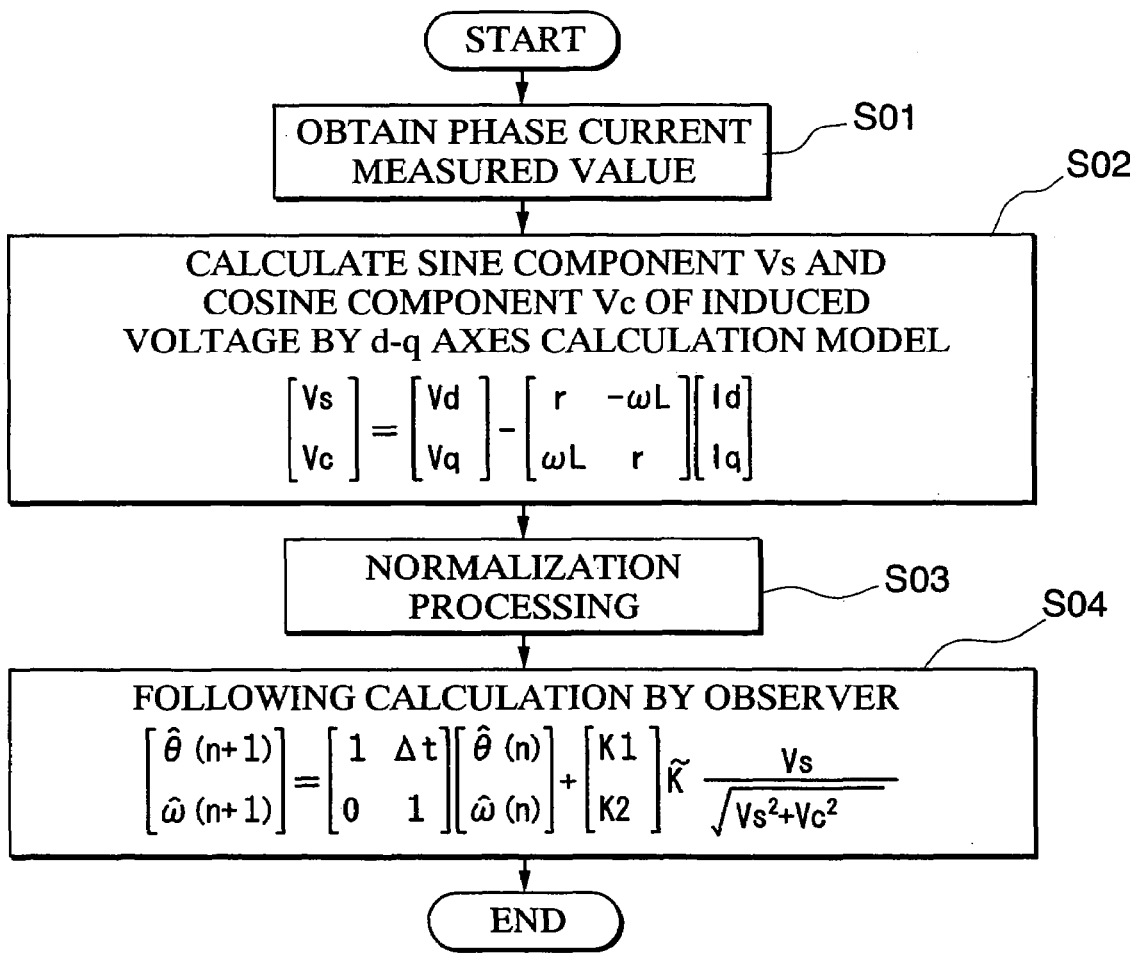
FIG. 3 is a flowchart of operations of the motor control apparatus in FIG. 1.

First, in Step S01 in FIG. 3, detection results of the current values of the phase currents output from the phase current detectors 27 and 27, for example, the U-phase current Iu and the W-phase current Iw are obtained.

Next, in Step S02, based on the d-axis voltage command value Vd and the q-axis voltage command value Vq, and the d-axis current Id and the q-axis current Iq, the sine component Vs and the cosine component Vc of the induced voltage constituted by the sine value sin $\theta e$ and the cosine value cos $\theta e$ of the angular difference $\theta e$ are calculated by the circuit equation on the d-q coordinates expressed as in Formula (3).

Then, in Step S03, based on the sine component Vs and the cosine component Vc of the induced voltage, as expressed in Formula (4), the state function ($\omega$Ke) in proportion to the rotational angular velocity $\omega$ is calculated, and the sine component Vs of the induced voltage is divided by the state function ($\omega$Ke) to calculate the angular difference approximate value ($-Vs/(Vs2+Vc2)^{1/2} \approx \theta e$).

Next, in Step S04, as expressed in Formula (8), the angular difference approximate value ($-Vs/(Vs2+Vc2)^{1/2} \approx \theta e$) is set as the input value to the following calculation processing, the following calculation processing is performed so as to converge the input value (that is, the angular difference $\theta e$) to zero, and thus the estimated rotation angle $\hat{\theta}$ and the rotational angular velocity estimated value $\hat{\omega}$ are subsequently updated for calculation to finish the series of processings.

As described above, according to the control apparatus for a brushless DC motor 10 of the first embodiment, the angular difference approximate value ($-Vs/(Vs2+Vc2)^{1/2} \approx \theta e$) obtained by normalization by the rotational angular velocity $\omega$ is set as the input value to the following calculation processing in the observer 17, thus improving calculation accuracy of the estimated rotation angle $\hat{\theta}$, compared to the case where an angular difference estimated value $\theta e s$ that is not normalized by a rotational angular velocity $\omega$ is set as an input value to a following calculation processing to calculate an estimated rotation angle $\hat{\theta}$.

In the first embodiment, the angular difference approximate value (Vs/(Vs2+Vc2)$^{1/2}$) obtained by dividing the sine component Vs of the induced voltage by the state function (for example, $\omega$Ke) in proportion to the rotational angular velocity c) is set as the input value to the following calculation processing to calculate the estimated rotation angle $\hat{\theta}$ in the observer 17, but is not limited to this. In a first variation of the first embodiment, the angular difference approximate value (Vs/(Vs2+Vc2)$^{1/2}$) may be further approximated according to the magnitude of absolute values of the sine component Vs and the cosine component Vc of the induced voltage as expressed in Formula (9), and the approximate value (for example, Vs/|Vs| or Vs/|Vc|) may be set as the input value to the following calculation processing to calculate the estimated rotation angle $\hat{\theta}$.

In this case, an excessively long processing time can be prevented particularly by a calculation processing of a square root ((Vs2+Vc2)$^{1/2}$) in the angular difference approximate value (Vs/(Vs2+Vc2)$^{1/2}$) obtained by dividing the sine component Vs of the induced voltage by the state function ($\omega$Ke) in proportion to the rotational angular velocity $\omega$.

$$\frac{Vs}{\sqrt{Vs^2 + Vc^2}} \approx \begin{cases} \frac{Vs}{|Vs|}, & (\text{WHEN } |Vs| > |Vc|) \\ \frac{Vs}{|Vc|}, & (\text{WHEN } |Vc| > |Vs|) \end{cases} \quad (9)$$

In a second variation of the first embodiment, an angular difference correction processing for correcting the angular difference approximate value ($-Vs/(Vs2+Vc2)^{1/2} \approx \theta e$) set as the input value to the following calculation processing may be performed by correcting the sine component Vs of the induced voltage according to the positive or negative sign of the cosine component Vc of the induced voltage.

In the second variation of the first embodiment, as shown in FIG. 4, after the normalization processing in Step S03, the process goes to Step 11 to perform a below described angular difference correction processing, and then perform the following calculation processing in Step S04.

Figure 5:
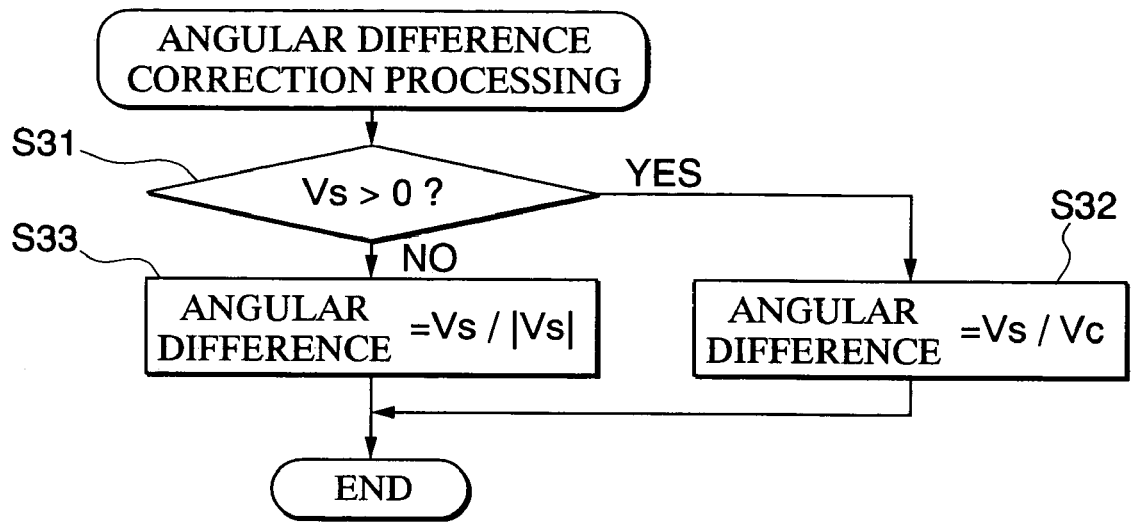
FIG. 5 is a flowchart of an angular difference correction processing in FIG. 4.

In the angular difference correction processing in Step S11, first in Step 21 in FIG. 5, it is determined whether the cosine component Vc of the induced voltage is less than zero.

When it is determined to be "YES", that is, when the sign of the cosine component Vc of the induced voltage is positive, the process goes to Step S22, and the angular difference approximate value ($-Vs/(Vs2+Vc2)^{1/2} \approx \theta e$), that is, the angular difference $\theta e$ set as the input value to the following calculation processing is set to Vs/Vc to finish the series of processings.

On the other hand, when it is determined to be "NO", that is, when the sign of the cosine component Vc of the induced voltage is negative, the process goes to Step S23, and the angular difference approximate value ($-Vs/(Vs2+Vc2)^{1/2} \approx \theta e$), that is, the angular difference $\theta e$ set as the input value to the following calculation processing is set to Vs/|Vs| to finish the series of processings.

Figure 6:
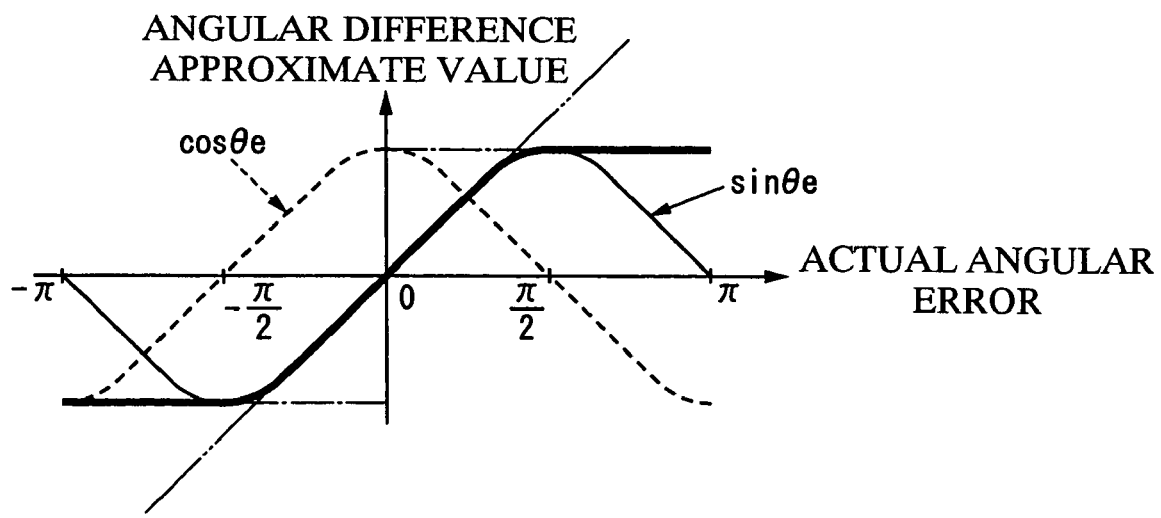
FIG. 6 is a graph of an example of variations of an actual angular error and an angular difference approximate value according to the second variation of the first embodiment.

Specifically, as shown in FIG. 6, in a range where an absolute value of an actual angular error, that is, an actual angular difference $\theta e$ is $\pi/2$ or less, the angular difference $\theta e$ can be approximated by the sine value sin $\theta e$ ($\theta e \approx \sin \theta e$), and thus the sine value sin $\theta e$ ($= Vs/(Vs2+Vc2)^{1/2} \approx Vs/Vc$) calculated based on the sine component Vs and the cosine component Vc of the induced voltage is set as the input value to the following calculation processing.

On the other hand, in a range where the absolute value of the actual angular error is more than $\pi/2$, the difference between the angular difference $\theta e$ and the sine value sin $\theta e$ is larger, and thus the angular difference $\theta e$ is not approximated by the sine value sin θe, but 1 or −1 is set as the input value to the following calculation processing.

Thus, a following property in the following calculation processing in the observer 17 can be improved.

In a third variation of the first embodiment, an angular difference correction processing for correcting the angular difference approximate value (−Vs/(Vs2+Vc2)½≈θe) set as the input value to the following collection processing may be performed by correcting the sine component Vs of the induced voltage according to a magnitude relation of absolute values of the sine component Vs and the cosine component Vc of the induced voltage.

Figure 7:
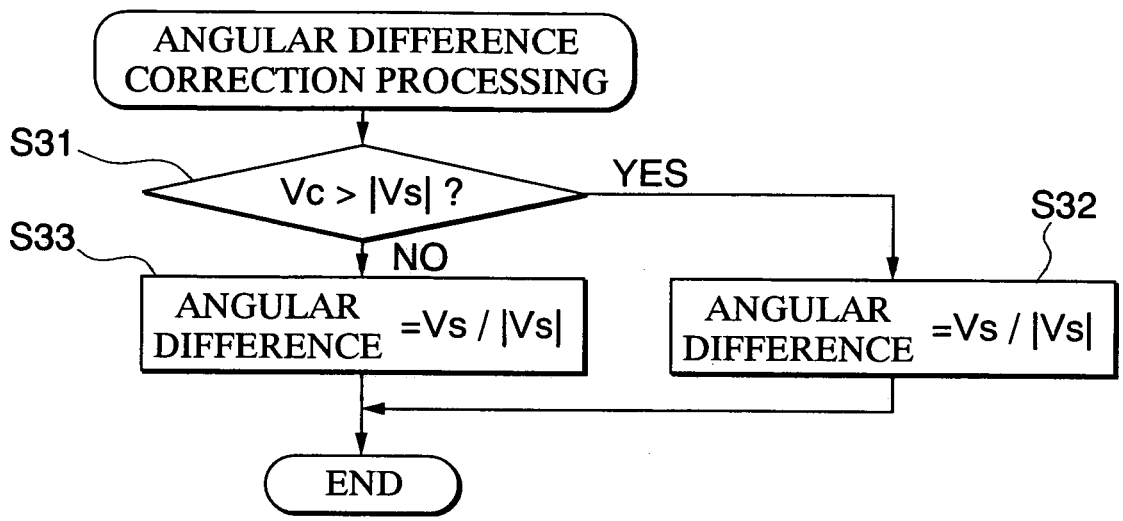
FIG. 7 is a flowchart of an angular difference correction processing according to a third variation of the first embodiment.

In the third variation of the first embodiment, as the angular difference correction processing in Step 11, first in Step 31 in FIG. 7, it is determined whether the cosine component Vc of the induced voltage is larger than the absolute value |Vs| of the sine component Vs of the induced voltage.

When it is determined to be "YES", the process goes to Step S32, and the angular difference approximate value (−Vs/(Vs2+Vc2)½≈θe), that is, the angular difference θe set as the input value to the following calculation processing is set to Vs/Vc to finish the series of processings.

On the other hand, when it is determined to be "NO", the process goes to Step S33, and the angular difference approximate value (−Vs/(Vs2+Vc2)½≈θe), that is, the angular difference θe set as the input value to the following calculation processing is set to Vs/|Vs| to finish the series of processings.

Figure 8:
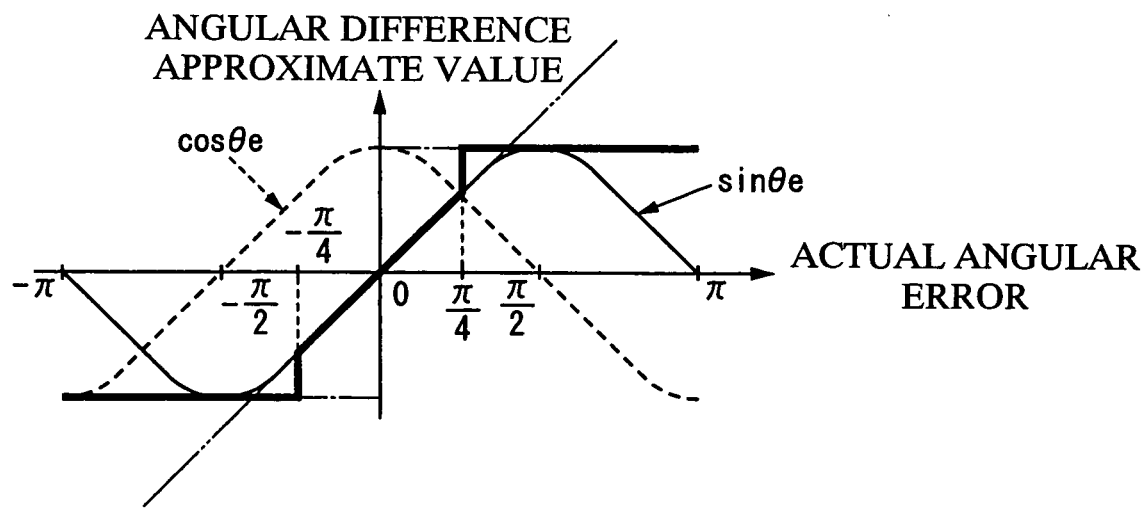
FIG. 8 is a graph of an example of variations of an actual angular error and an angular difference approximate value according to the third variation of the first embodiment.
Figure 9:
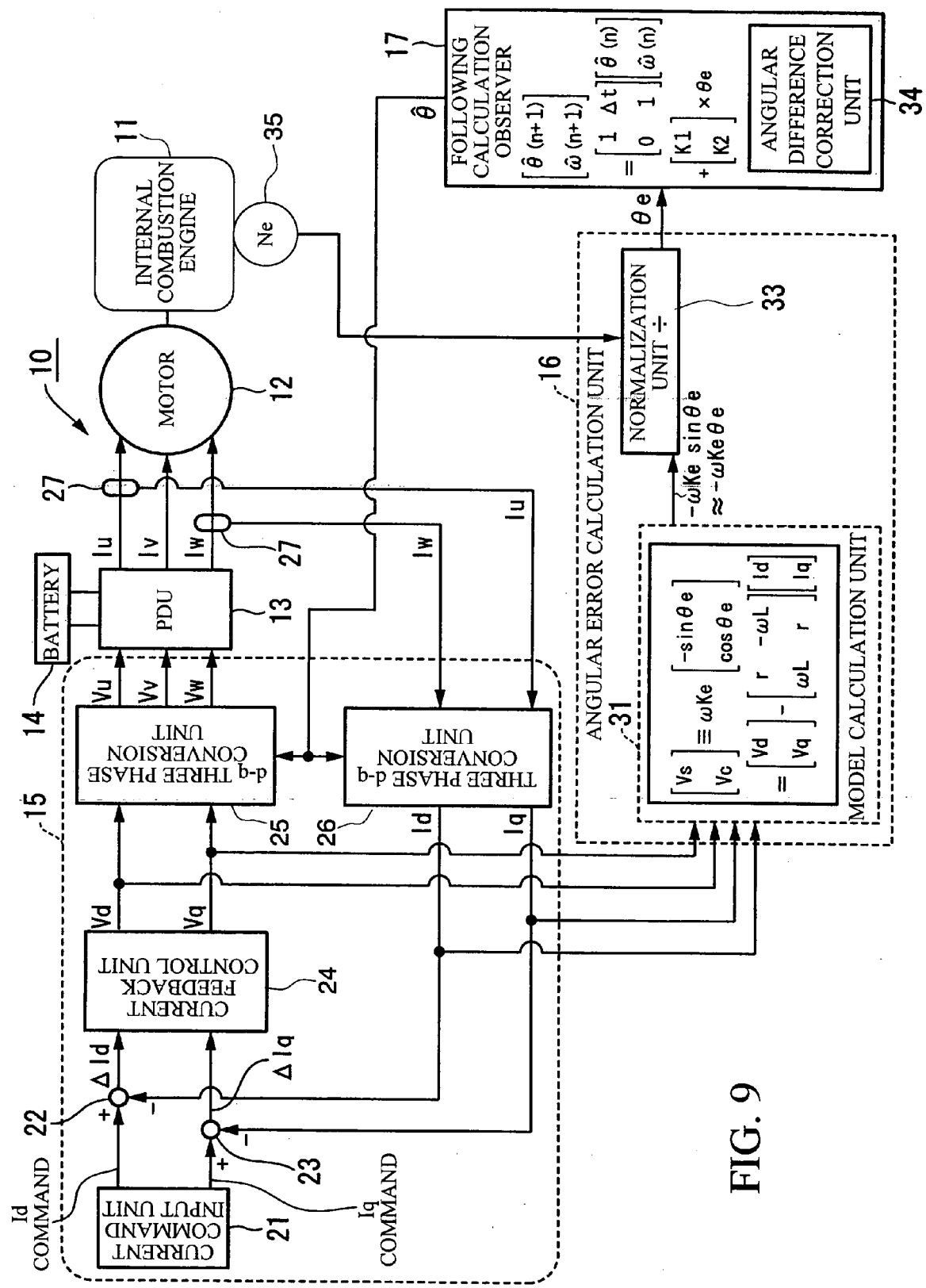
FIG. 9 shows a configuration of a control apparatus for a brushless DC motor according to a fourth variation of the first embodiment.

Specifically, as shown in FIG. 8, in a range where the absolute value of the actual angular error, that is, the actual angular difference θe is π/4 or less, the angular difference θe can be approximated by the sine value sin θe (θe≈sin θe), and thus the sine value sin θe (=Vs/(Vs2+Vc2)½≈Vs/Vc) calculated based on the sine component Vs and the cosine component Vc of the induced voltage is set as the input value to the following calculation processing.

On the other hand, in a range where the absolute value of the actual angular error is more than π/4, the difference between the angular difference θe and the sine value sin θe is larger, and thus the angular difference θe is not approximated by the sine value sin θe, and 1 or −1 is set as the input value to the following calculation processing.

Thus, setting the angle range where the angular difference θe is approximated by the sine value sin θe to be narrower than the second variation of the first embodiment further improves the following property in the following calculation in the observer 17.

In the first embodiment, as the normalization processing, the sine component Vs of the induced voltage calculated by the model calculation unit 31 is divided by the state function (for example, ωKe) in proportion to the rotational angular velocity ω calculated in the angular velocity state function calculation unit 32, but is not limited to this, as a fourth variation of the first embodiment in FIG. 8, the angular velocity state function calculation unit 32 may be omitted, an angular velocity calculation unit 36 may be provided that calculates the rotational angular velocity ω of the motor 12 based on the revolution speed of the engine Ne of the internal combustion engine 11 output from an engine revolution speed sensor 35, and the sine component Vs of the induced voltage may be divided by the rotational angular velocity ω as a normalization processing.

Specifically, in the fourth variation of the first embodiment, the motor 12 is connected in series to the internal combustion engine 11, and thus the rotational angular velocity ω of the motor 12 can be calculated from the revolution speed of the engine Ne in the angular velocity calculation unit 36, and the normalization unit 33 divides the sine component Vs of the induced voltage calculated in the model calculation unit 31 by the rotational angular velocity ω output from the angular velocity calculation unit 36 to calculate an approximate value (−Vs/ω≈Keθe) approximated by a value (Keθe) obtained by multiplying the angular difference θe by the induced voltage constant Ke, and input the value to the observer 17.

The observer 17 sets the approximate value (−Vs/ω≈Keθe) approximated by the value (Keθe) obtained by multiplying the angular difference θe by the induced voltage constant Ke as an input value to the following calculation processing, performs the following calculation processing so as to converge the input value to zero, thus successively updates the estimated rotation angle θ^ for calculation, and outputs a convergence value of the estimated rotation angle θ^ to the dq-three phase conversion unit 25 and the three phase-dq conversion unit 26 of the control unit 15.

Now, a second embodiment of a control apparatus for a brushless DC motor according to the invention will be described with reference to the accompanying drawings.

Figure 10:
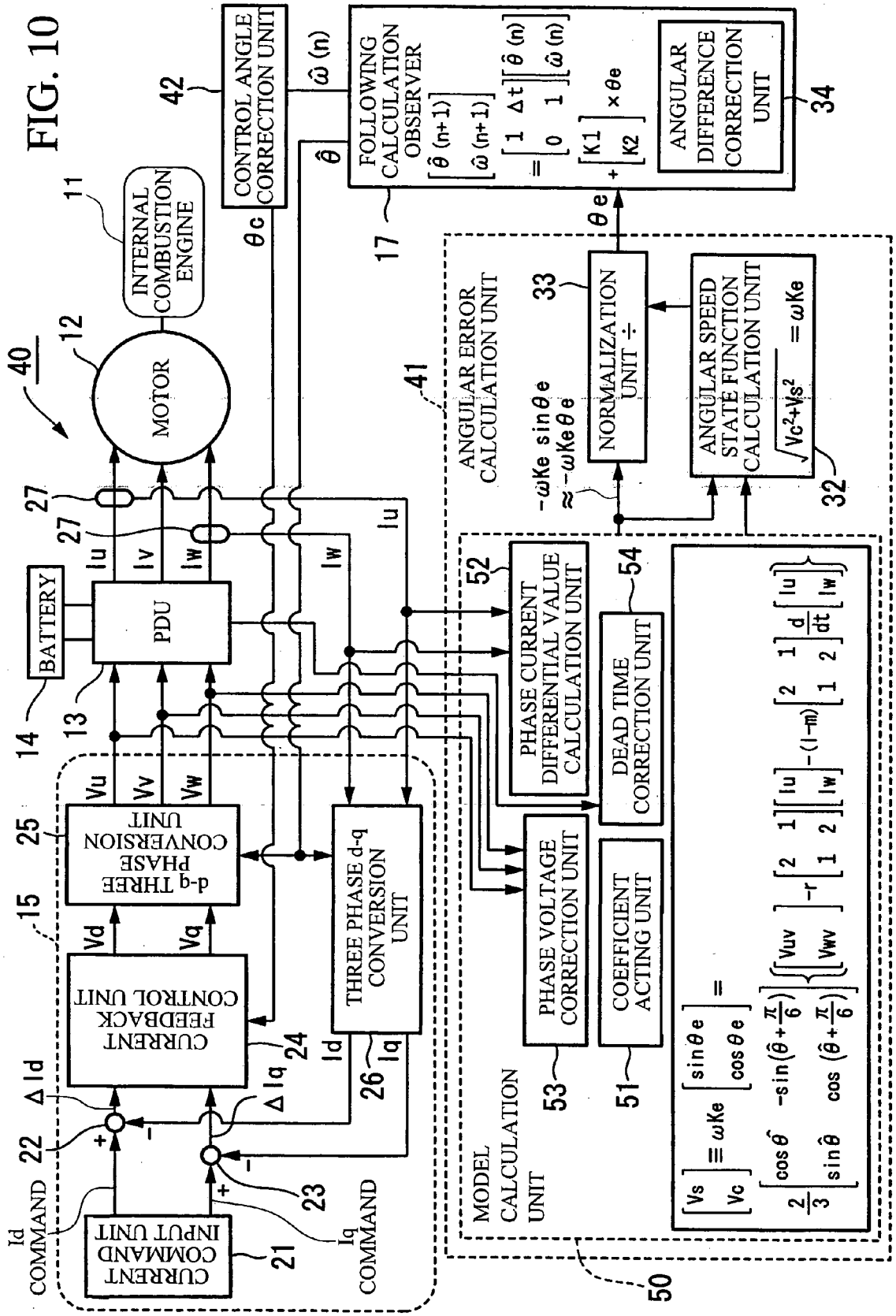
FIG. 10 shows a configuration of a control apparatus for a brushless DC motor according to a second embodiment.

The control apparatus for a brushless DC motor 40 (hereinafter simply referred to as the motor control apparatus 40) according to the second embodiment includes, as shown in FIG. 10, a power drive unit (PDU) 13, a battery 14, a control unit 15, an observer 17, an angular error calculation unit 41, and a control angle correction unit 42.

The same parts as in the first embodiment are denoted by the same reference numerals, and descriptions thereof will be simplified or omitted.

The angular error calculation unit 41 uses the fact that an angular difference θe can be approximated by a sine value sin θe (θe≈sin θe) when an angular difference θe (=θ−θ^) between an estimated rotation angle θ^ with respect to a rotation angle of a rotor and an actual rotation angle θ is relatively small to calculate the angular difference θe based on the sine value sin θe and a cosine value cos θe of the angular difference θe included in a circuit equation by, for example, a line voltage model, and output the angular difference θe to the observer 17.

The angular error calculation unit 41 includes, for example, a model calculation unit 50, an angular velocity state function calculation unit 32, and a normalization unit 33.

The model calculation unit 50 calculates a sine component Vs and a cosine component Vc of an induced voltage constituted by the sine value sin θe and the cosine value cos θe of the angular difference θe by a circuit equation in the line voltage model expressed as in Formula (10), based on a U-phase AC voltage command value Vu, a V-phase AC voltage command value Vv, and a W-phase AC voltage command value Vw output from a dq-three phase conversion unit 25, and measured values (for example, a U-phase current Iu, and a W-phase current Iw) output from two phase current detectors 27 and 27.

In Formula (10), saliency of a motor 12 such that an inductance component value varies according to a rotation position of a stator winding is ignored, and Vuv is a line voltage between a U-phase and a V-phase (=Vu−Vv); Vwv, a line voltage between a W-phase and the V-phase (=Vw−Vv); r, a phase resistance; l, a self inductance; m, a mutual inductance; ω, a rotational angular velocity of the rotor; and Ke, an induced voltage constant.

$$\begin{bmatrix} Vu - Vv \\ Vw - Vv \end{bmatrix} = \begin{bmatrix} Vuv \\ Vwv \end{bmatrix} = r \begin{bmatrix} 2 & 1 \\ 1 & 2 \end{bmatrix} \begin{bmatrix} Iu \\ Iw \end{bmatrix} + \qquad (10)$$

$$(l-m)\begin{bmatrix} 2 & 1 \\ 1 & 2 \end{bmatrix}\frac{d}{dt}\begin{bmatrix} Iu \\ Iw \end{bmatrix} + \omega Ke \begin{bmatrix} \sqrt{3}\sin(\theta + \frac{\pi}{6}) \\ \sqrt{3}\cos\theta \end{bmatrix} \approx$$

$$(l-m)\begin{bmatrix} 2 & 1 \\ 1 & 2 \end{bmatrix}\frac{d}{dt}\begin{bmatrix} Iu \\ Iw \end{bmatrix} + \omega Ke \begin{bmatrix} \sqrt{3}\sin(\theta + \frac{\pi}{6}) \\ \sqrt{3}\cos\theta \end{bmatrix}$$

The angular velocity state function calculation unit 32 calculates, as expressed in Formula (4), a value (ωKe) obtained by multiplying the rotational angular velocity ω by the induced voltage constant Ke as a state function in proportion to the rotational angular velocity ω, based on the sine component Vs and the cosine component Vc of the induced voltage calculated in the model calculation unit 50, and outputs the value to the normalization unit 33. The normalization unit 33 calculates an angular difference approximate value $(-Vs/(Vs2+Vc2)^{1/2} \approx \theta e)$ approximated by the angular difference θe by dividing the sine component Vs of the induced voltage calculated in the model calculation unit 50 by the state function (for example, ωKe) in proportion to the rotational angular velocity ω calculated in the angular velocity state function calculation unit 32, and inputs the value to the observer 17.

The model calculation unit 50 includes, for example, a coefficient acting unit 51, a phase current differential value calculation unit 52, a phase voltage correction unit 53, and a dead time correction unit 54.

The coefficient acting unit 51 causes, based on Formula (10), a matrix A including a predetermined estimated rotation angle θ^ to act from the left as expressed in Formulas (11) and (12) with respect to an induced voltage component obtained by subtracting voltage drop relating to the phase resistance r and voltage drop relating to the self inductance l and the mutual inductance m from the line voltages Vuv and Vwv.

Specifically, the model calculation unit 50 calculates the sine component Vs and the cosine component Vc of the induced voltage as values in proportion to the sine value sin θe and the cosine value cos θe of the angular difference θe based on Formulas (11) and (12).

$$A = \frac{2}{3}\begin{bmatrix} \cos\theta & -\sin(\theta + \frac{\pi}{6}) \\ \sin\theta & \cos(\theta + \frac{\pi}{6}) \end{bmatrix} \qquad (11)$$

$$A\left\{\begin{bmatrix} Vuv \\ Vwv \end{bmatrix} - r\begin{bmatrix} 2 & 1 \\ 1 & 2 \end{bmatrix}\begin{bmatrix} Iu \\ Iw \end{bmatrix} - (l-m)\begin{bmatrix} 2 & 1 \\ 1 & 2 \end{bmatrix}\frac{d}{dt}\begin{bmatrix} Iu \\ Iw \end{bmatrix}\right\} = \qquad (12)$$

$$\frac{2}{3}\begin{bmatrix} \cos\theta & -\sin(\theta + \frac{\pi}{6}) \\ \sin\theta & \cos(\theta + \frac{\pi}{6}) \end{bmatrix}$$

$$\left\{\begin{bmatrix} Vuv \\ Vwv \end{bmatrix} - r\begin{bmatrix} 2 & 1 \\ 1 & 2 \end{bmatrix}\begin{bmatrix} Iu \\ Iw \end{bmatrix} - (l-m)\begin{bmatrix} 2 & 1 \\ 1 & 2 \end{bmatrix}\frac{d}{dt}\begin{bmatrix} Iu \\ Iw \end{bmatrix}\right\} \approx$$

$$\frac{2}{3}\begin{bmatrix} \cos\theta & -\sin(\theta + \frac{\pi}{6}) \\ \sin\theta & \cos(\theta + \frac{\pi}{6}) \end{bmatrix}$$

$$\left\{\begin{bmatrix} Vuv \\ Vwv \end{bmatrix} - (l-m)\begin{bmatrix} 2 & 1 \\ 1 & 2 \end{bmatrix}\frac{d}{dt}\begin{bmatrix} Iu \\ Iw \end{bmatrix}\right\} =$$

$$\frac{2}{3}\begin{bmatrix} \cos\theta & -\sin(\theta + \frac{\pi}{6}) \\ \sin\theta & \cos(\theta + \frac{\pi}{6}) \end{bmatrix}\begin{bmatrix} \omega Ke & \sqrt{3}\sin(\theta + \theta e + \frac{\pi}{6}) \\ \omega Ke & \sqrt{3}\cos(\theta + \theta e) \end{bmatrix} =$$

$$\omega Ke\begin{bmatrix} \sin\theta e \\ \cos\theta e \end{bmatrix} \equiv \begin{bmatrix} Vs \\ Vc \end{bmatrix}$$

The phase current differential value calculation unit 52 calculates current differential values of the phase currents Iu and Iw included in the term of the voltage drop relating to the self inductance l and the mutual inductance m in Formula (12).

The phase current differential value calculation unit 52 sets a measured value of a current value Im (a current measured value) of a phase current output from the phase current detector 27 at a predetermined time interval Δt as time-series data, and calculates a time variation of an average current measured value by a filtering processing such as a least squares method or a moving average value calculation processing, based on four current measured values including a current measured value I0 at the present time t0, and at least two current measured values at past times, for example, a current measured value I1 at a time t1 (=t0−Δt); a current measured value I2 at a time t2(=t1−Δt=t0−2Δt); and a current measured value I3 at a time t3(=t2−Δt=t0−3Δt).

Figure 11:
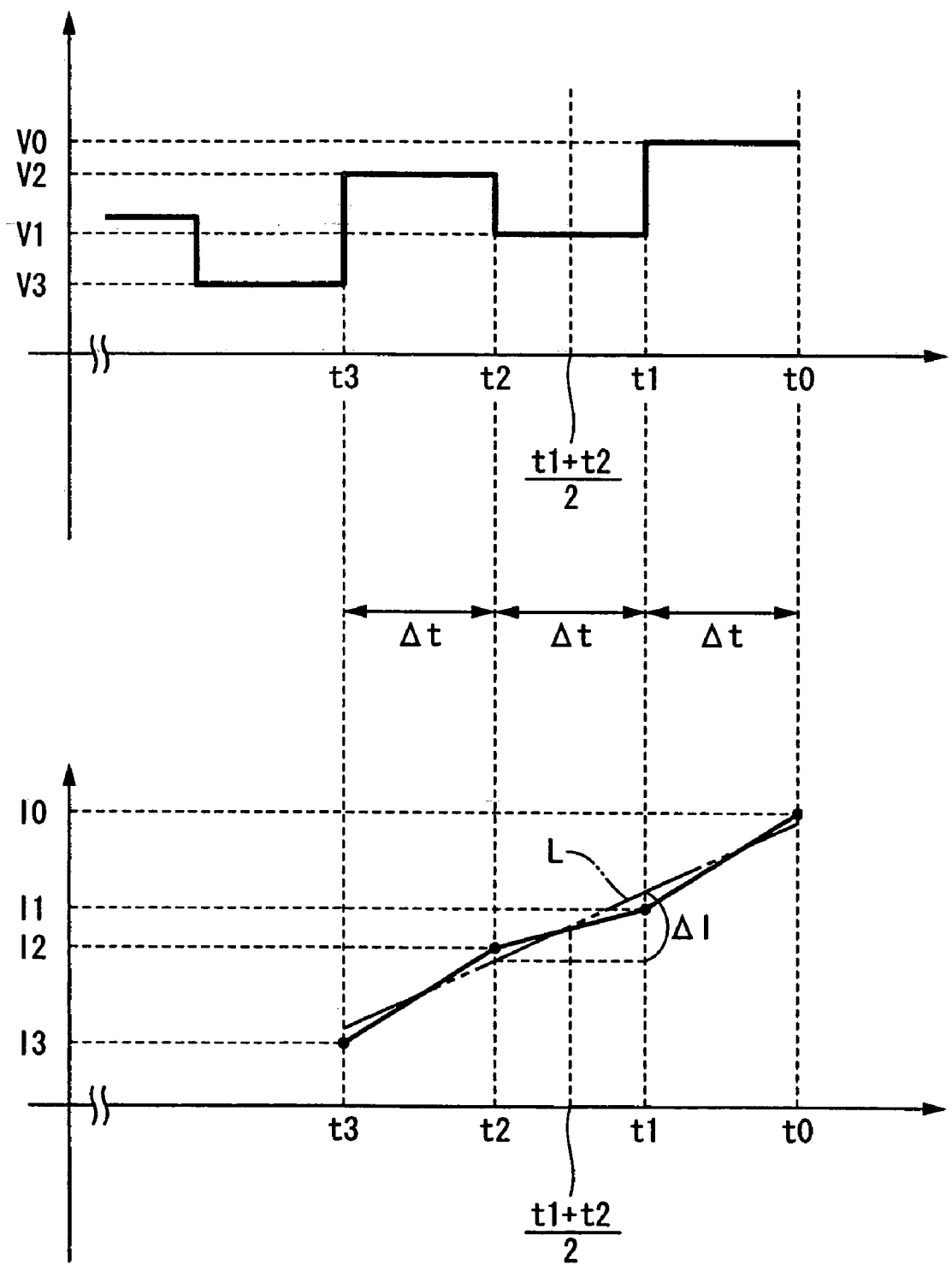
FIG. 11 is a graph of an example of time variations of phase voltage command values V1, V2 and V3 and current measured values I0, I1, I2 and I3 that form time-series data.

The time variation ΔI of the average current measured value at the predetermined time interval Δt obtained by the least squares method with respect to the current measured values I1, I1, I2 and I3 at the four times t0, t1, t2 and t3 is, as shown in FIG. 11, a value at a past time (t1+t2)/2 from the present time t0 by a time delay Td (=coefficient kd×predetermined time interval Δt, for example, kd=1.5). In FIG. 11, L is an approximate line indicating the time variation of the current measured value obtained by the least squares method.

The time variation ΔI and the current measured value Im corresponding to the time variation ΔI, that is, the current measured value Im at the time (t1+t2)/2 are expressed as in Formula (13) by the current measured values I0, I1, I2 and I3, and Formula (13) is modified as in Formula (14).

Specifically, the phase current differential value calculation unit 52 calculates the time variation ΔI of the average current measured value at the predetermined time interval Δt by Formula (14), and sets a time variation of the current measured value per unit time ΔI/Δt obtained by dividing the time variation ΔI by the predetermined time interval Δt as a current differential value of the phase current.

$$\begin{bmatrix} I0 \\ I1 \\ I2 \\ I3 \end{bmatrix} = \begin{bmatrix} 1.5 & 1 \\ 0.5 & 1 \\ -0.5 & 1 \\ -1.5 & 1 \end{bmatrix} \begin{bmatrix} \Delta I \\ Im \end{bmatrix} \qquad (13)$$

$$\begin{bmatrix} \Delta I \\ Im \end{bmatrix} = \begin{bmatrix} 0.3 & 0.1 & -0.1 & -0.3 \\ 0.25 & 0.25 & 0.25 & 0.25 \end{bmatrix} \begin{bmatrix} I0 \\ I1 \\ I2 \\ I3 \end{bmatrix} \qquad (14)$$

The phase voltage correction unit 53 corrects the voltage command values Vu, Vw and Vv for calculating the line voltage (for example, the line voltages Vuv and Vwv) according to the filtering processing in the phase current differential value calculation unit 52.

Specifically, corresponding to the fact that the time variation ΔI of the current measured value calculated in the phase current differential value calculation unit 52 is the value at the past time (t1+t2)/2, the phase voltage correction unit 53 sets a phase voltage command value at the time (t1+t2)/2 (for example, the phase voltage command value V1 in FIG. 11) as the voltage command values Vu, Vw and Vv for calculating the line voltage (for example, the line voltages Vuv and Vwv).

Alternatively, corresponding to the fact that the time variation ΔI of the current measured value is the average value at the past time (t1+t2)/2, the phase voltage correction unit 53 performs a filtering processing such as a least squares method or a moving average calculation processing with respect to the phase voltage command value V0 from the time t0 to the time t1, the phase voltage command value V1 from the time t1 to the time t2, the phase voltage command value V2 from the time t2 to the time t3, calculates an average phase voltage command value at the past time (t1+t2)/2 (for example, a moving average value (V0+V1+V2)/3), and sets the command value as the voltage command values Vu, Vw and Vv for calculating the line voltage (for example, the line voltages Vuv and Vwv).

A dead time correction unit 54 corrects the voltage command values Vu, Vw and Vv for calculating the line voltage (for example, the line voltages Vuv and Vwv) according to a dead time of a PWM inverter by pulse width modulation (PWM) included in the PDU 13 and polarities of the phase currents Iu, Iv and Iw supplied from the PDU 13 to the motor 12.

Figure 12:
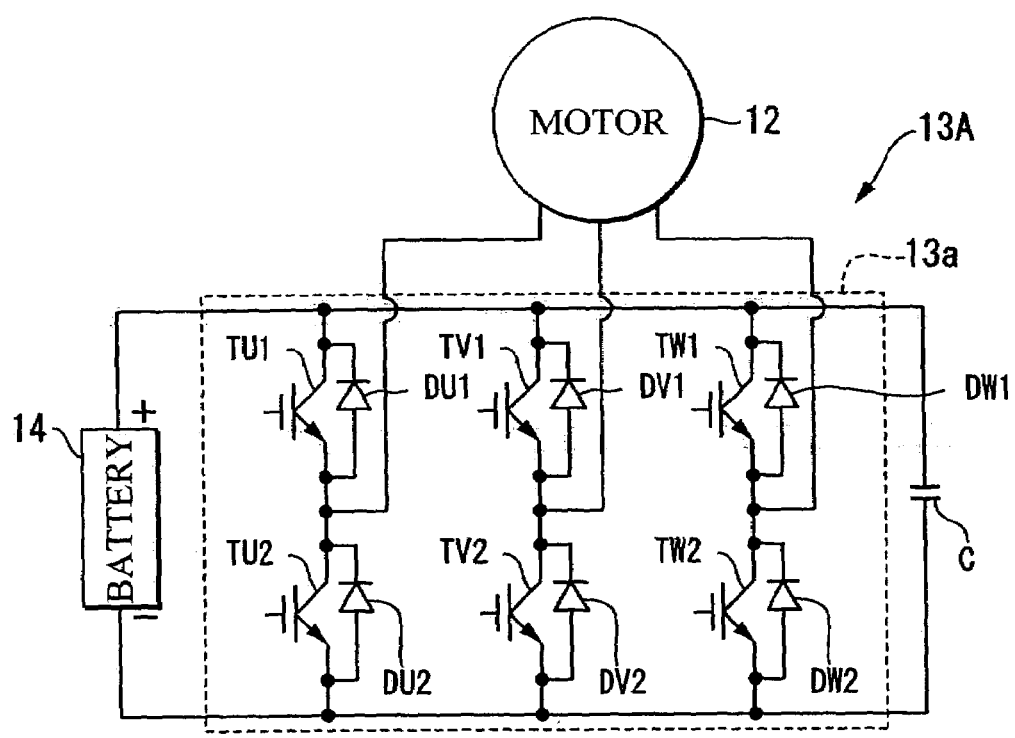
FIG. 12 shows configuration of a PWM inverter included in a PDU in FIG. 10.

Specifically, as show in FIG. 12, the PWM inverter 13A in the PDU 13 includes a bridge circuit 13a with a plurality of switching elements connected by bridges, and a smoothing capacitor C, and the bridge circuit 13a includes transistors TU1, TU2, TV1, TV2, TW1 and TW2 that are a plurality of switching elements.

Then, between a collector and an emitter of the transistors TU1, TU2, TV1, TV2, TW1 and TW2, diodes DU1, DU2, DV1, DV2, DW1 and DW2 are placed, an anode of each of the diodes DU1, DU2, DV1, DV2, DW1 and DW2 is connected to the emitter of each of the transistors TU1, TU2, TV1, TV2, TW1 and TW2, and a cathode of each of the diodes DU1, DU2, DV1, DV2, DW1 and DW2 is connected to each collector.

The collectors of the transistors TU1, TV1 and TW1 are connected to a positive pole terminal of the battery 14. The emitter of the transistor TU1 is connected to the collector of the transistor TU2, the emitter of the transistor TV1 is connected to the collector of the transistor TV2, and the emitter of the transistor TW1 is connected to the collector of the transistor TW2. The emitters of the transistors TU2, TV2 and TW2 are connected to a negative pole terminal of the battery 14.

A U-phase stator winding of the motor 12 is connected to the emitter of the transistor TU1 and the collector of the transistor TU2, a V-phase stator winding of the motor 12 is connected to the emitter of the transistor TV1 and the collector of the transistor TV2, and a W-phase stator winding of the motor 12 is connected to the emitter of the transistor TW1 and the collector of the transistor TW2.

Then, the smoothing capacitor C is connected between the positive pole terminal and the negative pole terminal of the battery 14.

The PWM inverter 13A switches on/off the pairs of transistors TU1 and TU2, transistors TV1 and TV2, and transistors TW1 and TW2 for each phase to pass an AC phase current to the stator winding of each phase. In order to prevent a phase short-circuit in the PWM inverter 13A, a dead time is provided for setting both of the pairs of transistors TU1 and TU2, transistors TV1 and TV2, and transistors TW1 and TW2 for each phase to an off state.

In the dead time, the current is commutated to either of the pairs of diodes DU1 and DU2, diodes DV1 and DV2, and diodes DW1 and DW2 for each phase according to the polarity of the phase current to vary an output voltage of the PWM inverter 13A.

Figure 13:
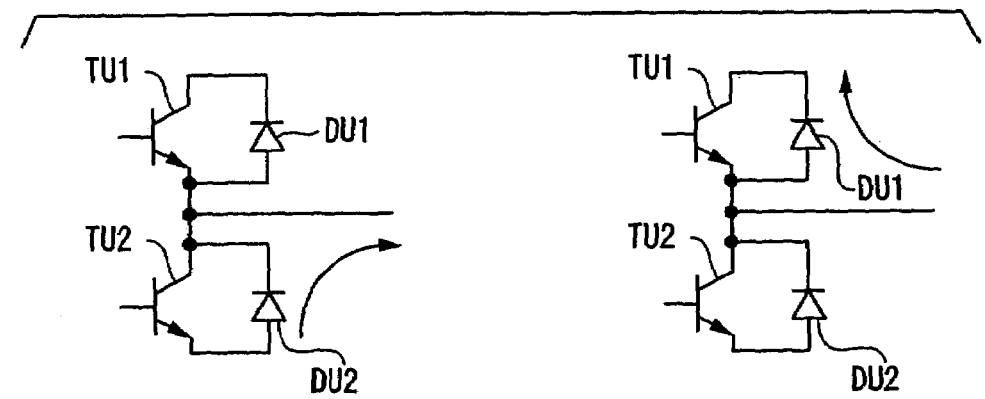
FIG. 13 shows commutation of a current that occurs in a dead time of the PWM inverter.

For example, as shown in FIG. 13, if both transistors TU1 and TU2 are set to the off state when the polarity of the phase current is positive with respect to the transistors TU1 and TU2 and the diodes DU1 and DU2 of the U-phase (that is, when the U-phase current Iu passes in a direction from the PWM inverter 13A to the motor 12), the current is commutated to the diode DU2 connected to the negative terminal of the battery 14 to reduce the output voltage. On the other hand, if the both transistors TU1 and TU2 are set to the off state when the polarity of the phase current is negative (that is, when the U-phase current Iu passes in a direction from the motor 12 to the PWM inverter 13A), the current is commutated to the diode DU1 connected to the positive terminal of the battery 14 to increase the output voltage.

Thus, an actual output voltage (an actual voltage) VR of each phase of the PWM inverter 13A is expressed as in Formula (15) according to a phase voltage command value Vm, a cycle T of pulse width modulation (PWM), a dead time TD, and a voltage between terminals VB of the battery 14.

The dead time correction unit 54 calculates the actual voltage VR based on Formula (15), and sets the actual voltage as the voltage command values Vu, Vw and Vv for calculating the line voltage (for example, the line voltages Vuv and Vwv).

$$\left. \begin{aligned} V_R &= Vm - \frac{T_D}{T} V_B, \quad (\text{PHASE CURRENT} > 0) \\ V_R &= Vm + \frac{T_D}{T} V_B, \quad (\text{PHASE CURRENT} < 0) \end{aligned} \right\} \qquad (15)$$

The control angle correction unit 42 corrects a control angle θc used in a current feedback control unit 24 corresponding to the filtering processing in the phase current differential value calculation unit 52.

Specifically, corresponding to the fact that the time variation ΔI of the current measured value calculated in the phase current differential value calculation unit 52 is the value at the past time (t1+t2)/2, the control angle correction unit 42 calculates, as expressed in Formula (16), a control angle θc(n) at the present time t0 with the time delay Td (=coefficient kd×predetermined time interval Δt, for example, kd=1.5) corrected, based on an estimated rotation angle θ^(n) and a rotational angular velocity estimated value ω^(n) calculated in the former following calculation processing in the observer 17, and outputs the control angle to the current feedback control unit 24.

Thus, in the second embodiment, the current feedback control unit 24 controls and amplifies a difference ΔId to calculate a d-axis voltage command value Vd, and controls and amplifies a difference ΔIq to calculate a q-axis voltage command value Vq by a PI (proportional plus integral) action according to the control angle θc.

$$\theta c = kd \cdot \Delta t \cdot \omega\hat{}(n) \quad (16)$$

The motor control apparatus 40 according to the second embodiment has the above described configuration, and now, operations of the motor control apparatus 40, more particularly, a calculation processing of the estimated rotation angle θ^ in sensorless control by the line voltage model will be described with reference to the accompanying drawings.

Figure 14:
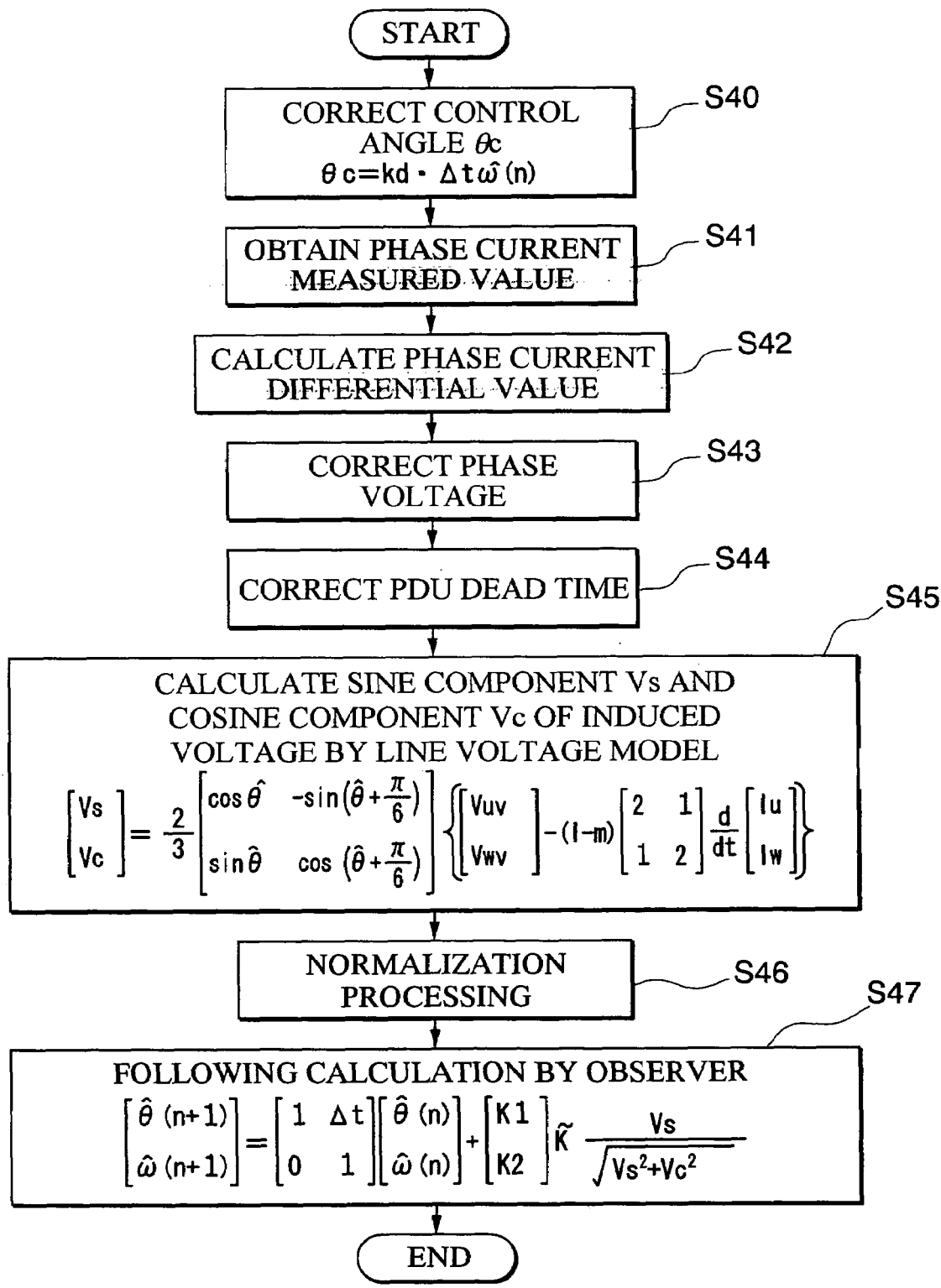
FIG. 14 is a flowchart of operations of the motor control apparatus in FIG. 10.

First, in Step S40 in FIG. 14, the control angle θc(n) at the present time t0 with the time delay Td (=coefficient kd×predetermined time interval Δt, for example, kd=1.5) corrected according to the filtering processing in the phase current differential value calculation unit 52 is calculated based on the estimated rotation angle θ^(n) and the rotational angular velocity estimated value ω^(n) calculated in the former following calculation processing in the observer 17 to output the control angle to the current feedback control unit 24.

Next, in Step S41, detection results of the current values of the phase currents output from the phase current detectors 27 and 27, for example, the U-phase current Iu and the W-phase current Iw are obtained.

Next, in Step S42, the current measured value output from the phase current detector 27 at the predetermined time interval Δt with respect to the phase currents Iu and Iw is set as time-series data, the time variation ΔI of the average current measured value at the predetermined time interval Δt is calculated by the least square method based on the current measured value I0 at the present time t0 and the current measured values I1, I2 and I3 at the past times t1, t2 and t3, and the value obtained by dividing the time variation ΔI of the calculated current measured value by the predetermined time interval Δt is set as the current differential value of the phase current.

Then, in Step S43, according to the filtering processing in the phase current differential value calculation unit 52, the phase voltage command value output from the dq-three phase conversion unit 25 to the voltage command values Vu, Vw and Vv for calculating the line voltage (for example, the line voltages Vuv and Vwv) at the predetermined time interval Δt is set as time-series data, and the value (V0+V1+V2)/3) obtained by the moving average value calculation processing with respect to the phase voltage command values V0, V1 and V2 are newly set as the voltage command values Vu, Vw and Vv for calculating the line voltage (for example, the line voltages Vuv and Vwv).

Then, in Step S44, the actual voltage VR is calculated based on Formula (15) with respect to the voltage command values Vu, Vw and Vv for calculating the line voltage (for example, the line voltages Vuv and Vwv), and newly set as the voltage command values Vu, Vw and Vv for calculating the line voltage (for example, the line voltages Vuv and Vwv).

Then, in Step S45, the sine component Vs and the cosine component Vc of the induced voltage constituted by the sine value sin θe and the cosine value cos θe of the angular difference θe are calculated by the circuit equation by the line voltage model expressed in Formula (12), based on the current differential values of the phase currents Iu and Iw, the line voltages Vuv and Vwv calculated from the voltage command values Vu, Vw and Vv, the phase resistance r, the self inductance l, and the mutual inductance m.

Then, in Step S46, based on the sine component Vs and the cosine component Vc of the induced voltage, as expressed in Formula (4), the state function (for example, ωKe) in proportion to the rotational angular velocity ω is calculated, and the sine component Vs of the induced voltage is divided by the state function (for example, ωKe) to calculate the angular difference approximate value (−Vs/(Vs2+Vc2)½≈θe).

Next, in Step S47, as expressed in Formula (8), the angular difference approximate value (−Vs/(Vs2+Vc2)½≈θe) is set as the input value to the following calculation processing, and the following calculation processing is performed so as to converge the input value (that is, the angular difference θe) to zero, and thus the estimated rotation angle θ^ and the rotational angular velocity estimated value ω^ are subsequently updated for calculation to finish the series of processings.

As described above, according to the control apparatus for a brushless DC motor 40 of the second embodiment, the angular difference approximate value (−Vs/(Vs2+Vc2)½≈θe) obtained by normalization by the rotational angular velocity ω is set as the input value to the following calculation processing in the observer 17, thus improving calculation accuracy of the estimated rotation angle θ^, compared to the case where an angular difference estimated value θes that is not normalized by a rotational angular velocity ω is set as an input value to a following calculation processing to calculate an estimated rotation angle θ^.

Furthermore, calculating the sine component Vs and the cosine component Vc of the induced voltage constituted by the sine value sin θe and the cosine value cos θe of the angular difference θe based on the circuit equation by the line voltage model allows the estimated rotation angle θ^ to be estimated with high accuracy even if a current waveform and a voltage waveform are deformed from a sine wave or are not a sine wave.

The line voltage model allows the sine component Vs of the induced voltage to be calculated even if the rotational angular velocity ω of the rotor is unknown in the first processing, unlike calculation of the sine component Vs of the induced voltage based on the d-q axes calculation model.

Correcting the voltage command values Vu, Vw and Vv for calculating the line voltage and correcting the control angle θc used in the current feedback control unit 24, according to the filtering processing for calculating the current differential value of the phase current with the current measured value output from the phase current detector 27 set as the time-series data, allow the estimated rotation angle θ^ to be estimated with high accuracy.

Furthermore, correcting the dead time of the PWM inverter 13A included in the PDU 13 with respect to the voltage command values Vu, Vw and Vv for calculating the line voltage (for example, the line voltages Vuv and Vwv) improves estimation accuracy of the estimated rotation angle θ^.

Figure 15A:
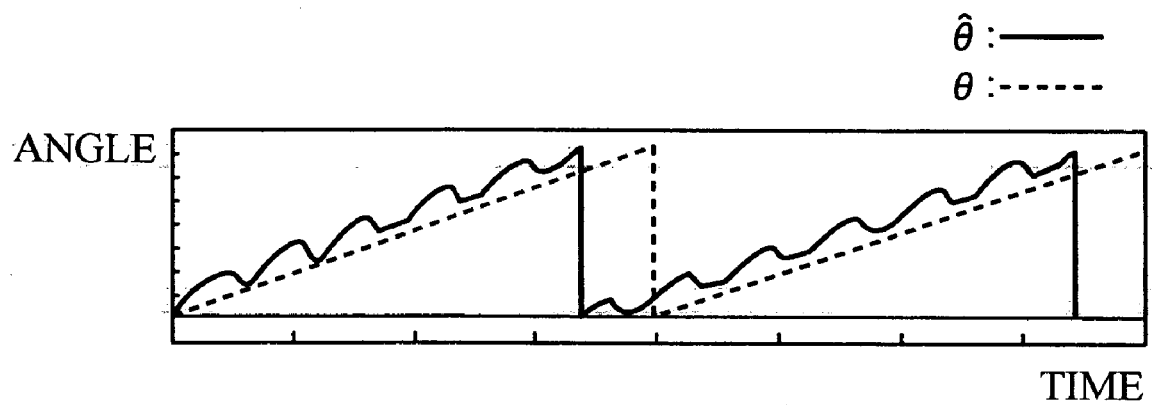
FIG. 15A is a graph of time variations of an estimated rotation angle θ^ estimated without correction of the dead time and an actual rotation angle θ.
Figure 15B:
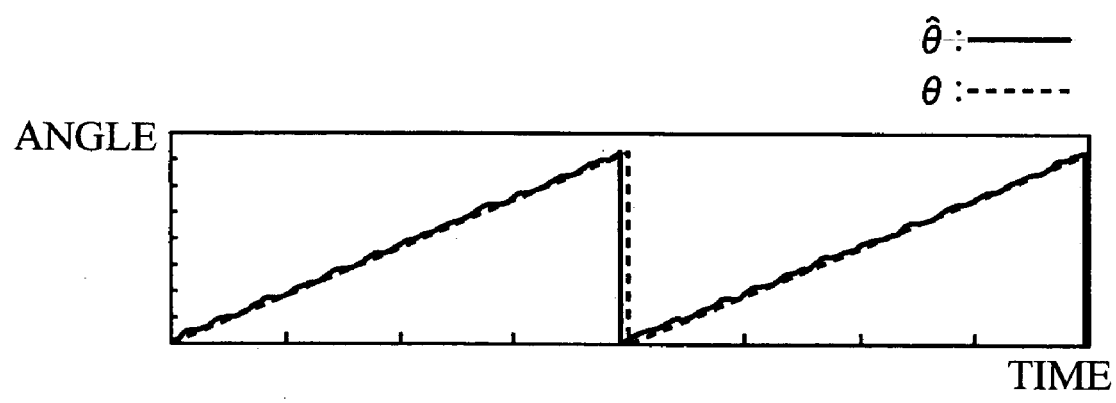
FIG. 15B is a graph of time variations of an estimated rotation angle θ^ estimated with the correction of the dead time and an actual rotation angle θ.

Specifically, if the output voltage of the PWM inverter 13A varies by the dead time of the PWM inverter 13A, the phase of the induced voltage is shifted, and thus a large time lag relative to the time variation of the actual rotation angle θ occurs in the time variation of the estimated rotation angle θ^ estimated without correction of the dead time in FIG. 15A. On the other hand, the time variation of the estimated rotation angle θ^ estimated with the correction of the dead time in FIG. 15B displays substantially the same variation as the time variation of the actual rotation angle θ to improve the estimation accuracy of the estimated rotation angle θ^.

In the first variation of the second embodiment, the angular difference approximate value (Vs/(Vs2+Vc2)½) may be approximated according to the magnitude of absolute values of the sine component Vs and the cosine component Vc of the induced voltage as in Formula (9), and the approximate value (for example, Vs/|Vs| or Vs/|Vc|) may be set as the input value to the following calculation processing to calculate the estimated rotation angle θ^.

In a second variation of the second embodiment, an angular difference correction processing for correcting the angular difference approximate value (−Vs/(Vs2+Vc2)½≈θe) set as the input value to the following calculation processing may be performed by correcting the sine component Vs of the induced voltage according to the positive or negative sign of the cosine component Vc of the induced voltage.

In the second variation of the second embodiment, as shown in FIG. 16, after the normalization processing in Step S46, the process goes to Step 11 to perform the angular difference correction processing from Step 21 to Step 23, and then perform the following calculation processing in Step S47.

In a third variation of the second embodiment, an angular difference correction processing for correcting the angular difference approximate value (−Vs/(Vs2+Vc2)½≈θe) set as the input value to the following calculation processing may be performed by correcting the sine component Vs of the induced voltage according to a magnitude relation of absolute values of the sine component Vs and the cosine component Vc of the induced voltage.

In the third variation of the second embodiment, after the normalization processing in Step S46, the process goes to Step 11 to perform the angular difference correction processing from Step 31 to Step S33, and then perform the following calculation processing in Step S47.

Figure 17:
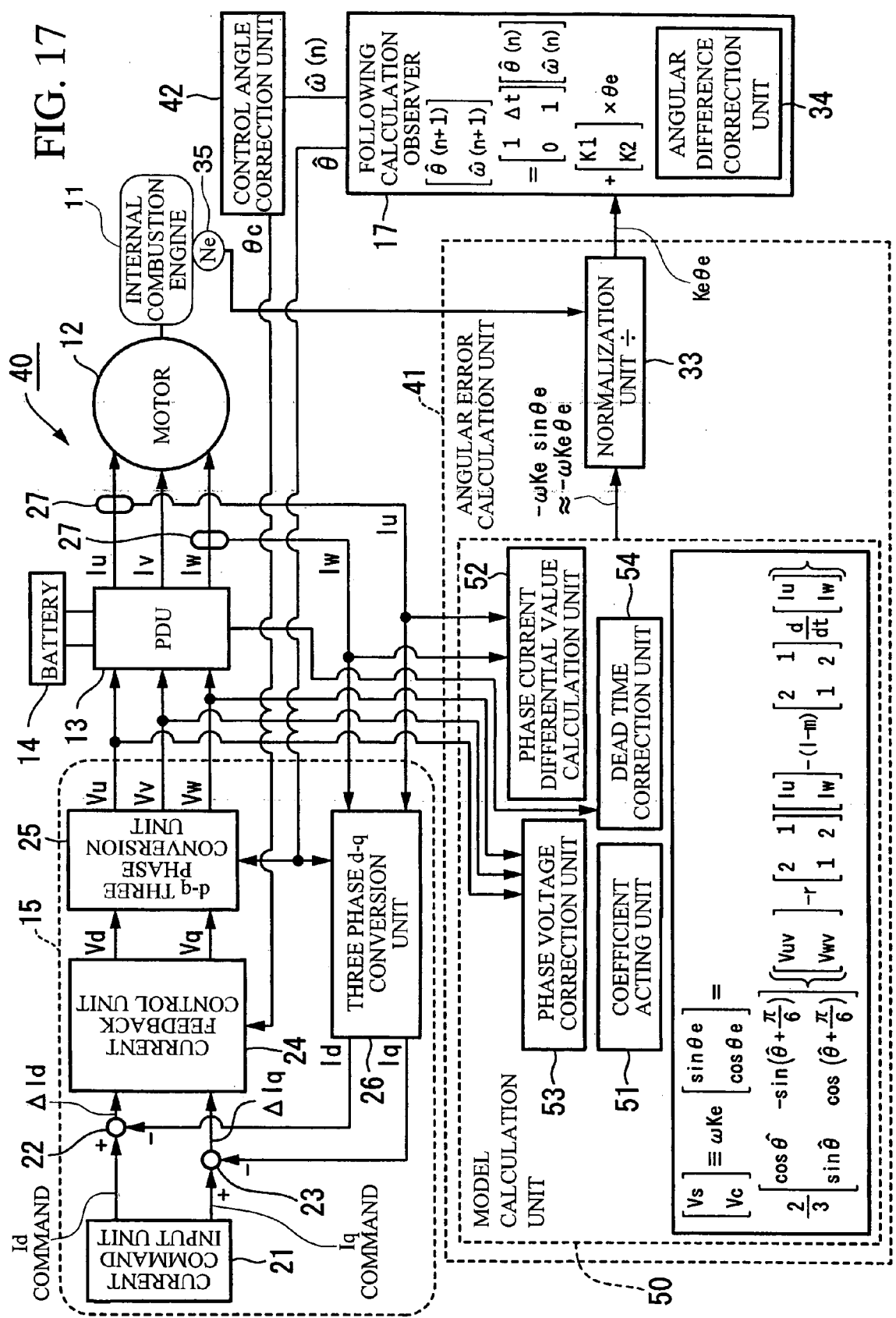
FIG. 17 shows a configuration of a control apparatus for a brushless DC motor according to a fourth variation of the second embodiment.

In a fourth variation of the second embodiment, as the control apparatus for a brushless DC motor 40 in FIG. 17, the angular velocity state function calculation unit 32 may be omitted, an angular velocity calculation unit 36 may be provided that calculates the rotational angular velocity ω of the motor 12 based on the revolution speed of the engine Ne of the internal combustion engine 11 output from an engine revolution speed sensor 35, and the sine component Vs of the induced voltage may be divided by the rotational angular velocity ω as a normalization processing.

Specifically, in the fourth variation of the second embodiment, the motor 12 is connected in series to the internal combustion engine 11, and thus the rotational angular velocity ω of the motor 12 can be calculated from the revolution speed of the engine Ne in the angular velocity calculation unit 36, and the normalization unit 33 divides the sine component Vs of the induced voltage calculated in the model calculation unit 50 by the rotational angular velocity ω output from the angular velocity calculation unit 36 to calculate an approximate value (−Vs/ω≈Keθe) approximated by a value (Keθe) obtained by multiplying the angular difference θe by the induced voltage constant Ke, and input the value to the observer 17.

The observer 17 sets the approximate value (−Vs/ω≈Keθe) approximated by the value (Keθe) obtained by multiplying the angular difference θe by the induced voltage constant Ke as an input value to the following calculation processing, performs the following calculation processing so as to converge the input value to zero, thus successively updates the estimated rotation angle θ^ for calculation, and outputs a convergence value of the estimated rotation angle θ^ to the dq-three phase conversion unit 25 and the three phase-dq conversion unit 26 of the control unit 15.

Figure 18A:
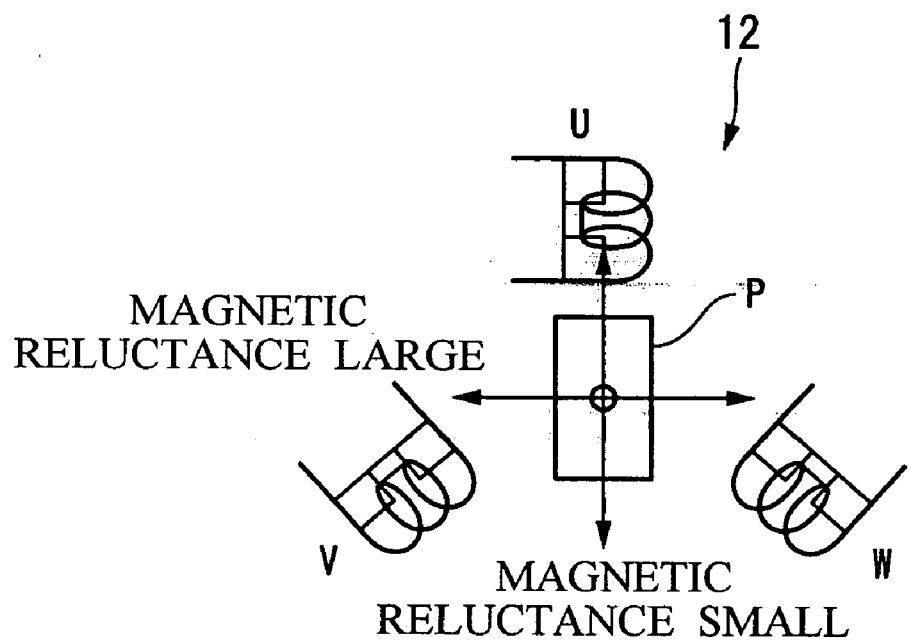
FIG. 18A schematically shows a motor according to a fifth variation of the second embodiment.
Figure 18B:
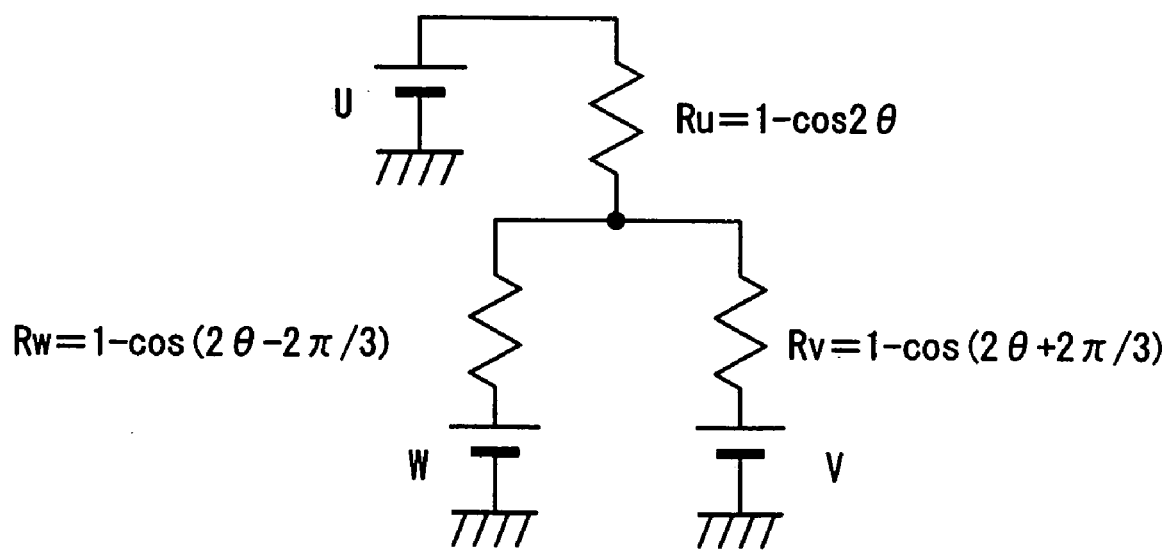
FIG. 18B shows a magnetic circuit of the motor in FIG. 18A.

In the second embodiment, the line voltage model that ignores saliency of the motor 12 is used as expressed in Formula (10), but as a fifth variation of the second embodiment in FIGS. 18A and 18B, the motor 12 may have saliency so that the inductance component value varies according to the rotation position of the stator winding.

In the fifth variation of the second embodiment, by postulating that the saliency of the motor 12 results from a magnetic substance P formed to be long along a diameter of the rotor as in FIG. 18A, a magnetic reluctance of an air gap of the motor 12 varies twice per cycle of the rotation of the rotor, that is, in a half cycle of the rotation of the rotor.

If the variation of the magnetic reluctance is set as a unit cosine wave, and an average value is set to 0.5, magnetic reluctances Ru, Rv and Rw of the phases are expressed as in Formula (17), for example, in a magnetic circuit in FIG. 18B.

$$\left. \begin{array}{l} Ru = 1 - \cos 2\theta \\ Rv = 1 - \cos\left(2\theta + \frac{2\pi}{3}\right) \\ Rw = 1 - \cos\left(2\theta - \frac{2\pi}{3}\right) \end{array} \right\} \quad (17)$$

A magnetic reluctance Rg of the air gap viewed from the U-phase is expressed as in Formula (18).

$$Rg = Ru + \frac{Rv \cdot Rw}{Rv + Rw} = \qquad (18)$$

$$1 - \cos 2\theta + \frac{1 - \cos\left(2\theta - \frac{2}{3}\pi\right) - \cos\left(2\theta + \frac{2}{3}\pi\right) + \cos\left(2\theta - \frac{2}{3}\pi\right)\cos\left(2\theta + \frac{2}{3}\pi\right)}{2 - \cos\left(2\theta - \frac{2}{3}\pi\right) - \cos\left(2\theta + \frac{2}{3}\pi\right)} = \frac{5 + \cos\frac{2}{3}\pi}{4 + 2\cos 2\theta}$$

Thus, by postulating a unit winding for the stator winding, a U-phase inductance Lu is expressed as in Formula (19), and mutual inductances Mwv and Muv are expressed as in Formula (20).

$$Lu = 1/Rg = \frac{4 + 2\cos 2\theta}{5 + \cos\frac{2}{3}\pi} \qquad (19)$$

$$Muw = -\frac{Rw}{Rv+Rw}Lu = -\frac{1-\cos\left(2\theta+\frac{2}{3}\pi\right)}{2-\cos\left(2\theta-\frac{2}{3}\pi\right)-\cos\left(2\theta-\frac{2}{3}\pi\right)} \times \quad (20)$$

$$\frac{4+2\cos 2\theta}{5+\cos\frac{2}{3}\pi} = -\frac{2-2\cos\left(2\theta+\frac{2}{3}\pi\right)}{5+\cos\frac{2}{3}\pi}$$

$$Muv = -\frac{Rv}{Rv+Rw}Lu = -\frac{2-2\cos\left(2\theta-\frac{2}{3}\pi\right)}{5+\cos\frac{2}{3}\pi}$$

From Formulas (18) to (20), the self inductance and the mutual inductance of the motor 12 having the saliency are generally expressed as in Formula (21), and a voltage equation of the motor 12 is expressed as in Formula (22).

$$\begin{bmatrix} l-\Delta|\cos 2\theta & m-\Delta|\cos\left(2\theta-\frac{2}{3}\pi\right) & m-\Delta|\cos\left(2\theta+\frac{2}{3}\pi\right) \\ m-\Delta|\cos\left(2\theta-\frac{2}{3}\pi\right) & l-\Delta|\cos\left(2\theta+\frac{2}{3}\pi\right) & m-\Delta|\cos 2\theta \\ m-\Delta|\cos\left(2\theta+\frac{2}{3}\pi\right) & m-\Delta|\cos 2\theta & l-\Delta|\cos\left(2\theta-\frac{2}{3}\pi\right) \end{bmatrix} \quad (21)$$

$$\begin{bmatrix} Vu \\ Vv \\ Vw \end{bmatrix} = r\begin{bmatrix} Iu \\ Iv \\ Iw \end{bmatrix} + \frac{d}{dt} \quad (22)$$

$$\begin{bmatrix} l-\Delta|\cos 2\theta & m-\Delta|\cos\left(2\theta-\frac{2}{3}\pi\right) & m-\Delta|\cos\left(2\theta+\frac{2}{3}\pi\right) \\ m-\Delta|\cos\left(2\theta-\frac{2}{3}\pi\right) & l-\Delta|\cos\left(2\theta+\frac{2}{3}\pi\right) & m-\Delta|\cos 2\theta \\ m-\Delta|\cos\left(2\theta+\frac{2}{3}\pi\right) & m-\Delta|\cos 2\theta & l-\Delta|\cos\left(2\theta-\frac{2}{3}\pi\right) \end{bmatrix}\begin{bmatrix} Iu \\ Iv \\ Iw \end{bmatrix} +$$

$$\omega Ke\begin{bmatrix} \sin\omega t \\ \sin\left(\omega t-\frac{2}{3}\pi\right) \\ \sin\left(\omega t-\frac{4}{3}\pi\right) \end{bmatrix}$$

Based on Formula (22), the circuit equation of the line voltage model is expressed as in Formula (23).

$$\begin{bmatrix} 1 & -1 & 0 \\ 0 & -1 & 1 \end{bmatrix}\begin{bmatrix} Vu \\ Vv \\ Vw \end{bmatrix} = \begin{bmatrix} Vu-Vv \\ Vw-Vv \end{bmatrix} \approx \begin{bmatrix} 1 & -1 & 0 \\ 0 & -1 & 1 \end{bmatrix}\left(r\begin{bmatrix} Iu \\ Iv \\ Iw \end{bmatrix} + \frac{d}{dt}\right. \quad (23)$$

$$\left.\begin{bmatrix} l-\Delta|\cos 2\theta & m-\Delta|\cos\left(2\theta-\frac{2}{3}\pi\right) & m-\Delta|\cos\left(2\theta+\frac{2}{3}\pi\right) \\ m-\Delta|\cos\left(2\theta-\frac{2}{3}\pi\right) & l-\Delta|\cos\left(2\theta+\frac{2}{3}\pi\right) & m-\Delta|\cos 2\theta \\ m-\Delta|\cos\left(2\theta+\frac{2}{3}\pi\right) & m-\Delta|\cos 2\theta & l-\Delta|\cos\left(2\theta-\frac{2}{3}\pi\right) \end{bmatrix}\begin{bmatrix} Iu \\ Iv \\ Iw \end{bmatrix} + \omega Ke\right.$$

$$\begin{bmatrix} \sin\omega t \\ \sin\left(\omega t - \frac{2}{3}\pi\right) \\ \sin\left(\omega t - \frac{4}{3}\pi\right) \end{bmatrix} =$$

$$r\begin{bmatrix} 2 & 1 \\ 1 & 2 \end{bmatrix}\begin{bmatrix} Iu \\ Iw \end{bmatrix} + (l-m)\begin{bmatrix} 2 & 1 \\ 1 & 2 \end{bmatrix}\frac{d}{dt}\begin{bmatrix} Iu \\ Iw \end{bmatrix} + \omega\begin{bmatrix} -6\Delta|\sin\left(2\theta - \frac{2}{3}\pi\right) & 6\Delta|\sin\left(2\theta + \frac{2}{3}\pi\right) \\ 6\Delta|\sin\left(2\theta + \frac{2}{3}\pi\right) & -6\Delta|\sin 2\theta \end{bmatrix}\begin{bmatrix} Iu \\ Iw \end{bmatrix}$$

$$+ \begin{bmatrix} 3\Delta|\cos\left(2\theta - \frac{2}{3}\pi\right) & -3\Delta|\cos\left(2\theta + \frac{2}{3}\pi\right) \\ -3\Delta|\cos\left(2\theta + \frac{2}{3}\pi\right) & 3\Delta|\cos 2\theta \end{bmatrix}\frac{d}{dt}\begin{bmatrix} Iu \\ Iw \end{bmatrix} +$$

$$\omega Ke\begin{bmatrix} \sqrt{3}\sin\left(\theta + \frac{\pi}{6}\right) \\ \sqrt{3}\cos\theta \end{bmatrix}$$

In Formula (23), if the phase currents Iu and Iw are sine waves and expressed as in Formula (24), the term including 2θ is expressed as in Formulas (25) and (26).

Thus, Formula (23) is expressed as in Formula (27).

$$\begin{bmatrix} Iu \\ Iw \end{bmatrix} = \begin{bmatrix} I\sin(\theta + \alpha) \\ I\sin\left(\theta + \alpha + \frac{2}{3}\pi\right) \end{bmatrix} \quad (24)$$

$$\omega\begin{bmatrix} -6\Delta|\sin\left(2\theta - \frac{2}{3}\pi\right) & 6\Delta|\sin\left(2\theta + \frac{2}{3}\pi\right) \\ 6\Delta|\sin\left(2\theta + \frac{2}{3}\pi\right) & -6\Delta|\sin 2\theta \end{bmatrix}\begin{bmatrix} Iu \\ Iw \end{bmatrix} = \omega \quad (25)$$

$$\begin{bmatrix} -6\Delta|\sin\left(2\theta - \frac{2}{3}\pi\right) & 6\Delta|\sin\left(2\theta + \frac{2}{3}\pi\right) \\ 6\Delta|\sin\left(2\theta + \frac{2}{3}\pi\right) & -6\Delta|\sin 2\theta \end{bmatrix}$$

$$\begin{bmatrix} \sin(\theta+\alpha) \\ I\sin\left(\theta+\alpha+\frac{2}{3}\pi\right) \end{bmatrix} = 3\omega\Delta|I\begin{bmatrix} \sqrt{3}\cos\left(\theta-\alpha+\frac{\pi}{6}\right) \\ \sqrt{3}\sin(\theta-\alpha) \end{bmatrix}$$

$$\begin{bmatrix} 3\Delta|\cos\left(2\theta - \frac{2}{3}\pi\right) & -3\Delta|\cos\left(2\theta + \frac{2}{3}\pi\right) \\ 3\Delta|\cos\left(2\theta + \frac{2}{3}\pi\right) & 3\Delta|\cos 2\theta \end{bmatrix}\frac{d}{dt}\begin{bmatrix} Iu \\ Iw \end{bmatrix} = \quad (26)$$

$$3\omega\Delta\left\|\begin{bmatrix} \cos\left(2\theta-\frac{2}{3}\pi\right) & -\cos\left(2\theta+\frac{2}{3}\pi\right) \\ -\cos\left(2\theta+\frac{2}{3}\pi\right) & \cos 2\theta \end{bmatrix}\begin{bmatrix} \cos(\theta+\alpha) \\ \cos\left(\theta+\alpha+\frac{2}{3}\pi\right) \end{bmatrix}\right\| =$$

$$\frac{3\omega\Delta|I}{2}\begin{bmatrix} -\sqrt{3}\cos\left(\theta-\alpha+\frac{\pi}{6}\right) \\ -\sqrt{3}\sin(\theta-\alpha) \end{bmatrix}$$

$$\begin{bmatrix} Vu - Vv \\ Vw - Vv \end{bmatrix} = \begin{bmatrix} Vuv \\ Vwv \end{bmatrix} = r\begin{bmatrix} 2 & 1 \\ 1 & 2 \end{bmatrix}\begin{bmatrix} Iu \\ Iw \end{bmatrix} + (l-m)\begin{bmatrix} 2 & 1 \\ 1 & 2 \end{bmatrix}\frac{d}{dt}\begin{bmatrix} Iu \\ Iw \end{bmatrix} + \quad (27)$$

$$\frac{3\omega\Delta|I}{2}\begin{bmatrix} \sqrt{3}\cos\left(\theta-\alpha+\frac{\pi}{6}\right) \\ \sqrt{3}\sin(\theta-\alpha) \end{bmatrix} + \omega Ke\begin{bmatrix} \sqrt{3}\sin\left(\theta+\frac{\pi}{6}\right) \\ \sqrt{3}\cos\theta \end{bmatrix}$$

In Formula (27), the third term on the right side indicates a voltage by reluctance torque, and the voltage may be included in the induced voltage if the magnitude and the phase of the current are determined. Thus, if the induced voltage including the reluctance torque is defined as expressed in Formula (28), Formula (27) is expressed as in Formula (29) and similar to Formula (10), and thus the estimated rotation angle θ^ can be estimated by a processing similar to that when the saliency of the motor 12 is ignored as in the second embodiment.

In Formulas (28) and (29), Ke~ is an induced voltage constant that varies according to a current value, and θ~ is an actual rotation angle that varies according to the current value.

$$\omega \tilde{K}e\begin{bmatrix} \sqrt{3}\sin\left(\tilde{\theta}+\frac{\pi}{6}\right) \\ \sqrt{3}\cos\tilde{\theta} \end{bmatrix} = \quad (28)$$

$$\frac{3\omega\Delta|I}{2}\begin{bmatrix} \sqrt{3}\cos\left(\theta-\alpha+\frac{\pi}{6}\right) \\ \sqrt{3}\sin(\theta-\alpha) \end{bmatrix} + \omega Ke\begin{bmatrix} \sqrt{3}\sin\left(\theta+\frac{\pi}{6}\right) \\ \sqrt{3}\cos\theta \end{bmatrix}$$

$$\begin{bmatrix} Vu-Vv \\ Vw-Vv \end{bmatrix} = \begin{bmatrix} Vuv \\ Vwv \end{bmatrix} = r\begin{bmatrix} 2 & 1 \\ 1 & 2 \end{bmatrix}\begin{bmatrix} Iu \\ Iw \end{bmatrix} + \quad (29)$$

$$(l-m)\begin{bmatrix} 2 & 1 \\ 1 & 2 \end{bmatrix}\frac{d}{dt}\begin{bmatrix} Iu \\ Iw \end{bmatrix} + \omega \tilde{K}e\begin{bmatrix} \sqrt{3}\sin\left(\tilde{\theta}+\frac{\pi}{6}\right) \\ \sqrt{3}\cos\tilde{\theta} \end{bmatrix}$$

In the fifth variation of the second embodiment, if the phase currents Iu and Uw are not sine waves and include harmonics, a processing unit having a low-pass property may be provided in the observer 17 or the like, and the estimated rotation angle θ^ can be estimated with high accuracy even with an influence of harmonics.

In the first and second embodiments, the observer 17 performs the following calculation processing based on Formula (8), but is not limited to this, and may perform the following calculation processing based on Formula (30).

$$\begin{bmatrix} \hat{\theta} & (n+1) \\ \hat{\omega} & (n+1) \end{bmatrix} = \begin{bmatrix} 1 & \Delta t \\ 0 & 1 \end{bmatrix} \begin{bmatrix} \hat{\theta} & (n) \\ \hat{\omega} & (n) \end{bmatrix} + \begin{bmatrix} K1 \\ K2 \end{bmatrix} \tilde{K} \frac{1}{2} \tan^{-1} \tag{30}$$

$$\frac{Vs}{Vc} = \begin{bmatrix} 1 & \Delta t \\ 0 & 1 \end{bmatrix} \begin{bmatrix} \hat{\theta} & (n) \\ \hat{\omega} & (n) \end{bmatrix} + \begin{bmatrix} K1 \\ K2 \end{bmatrix} \tilde{K}(\theta e(n) + \text{offset})$$

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A control apparatus for a brushless DC motor that rotatably drives the brushless DC motor including a rotor having a permanent magnet, and a stator having stator windings of a plurality of phases that generate a rotating magnetic field for rotating the rotor, by a current passage switching device constituted by a plurality of switching elements and performing successive commutation of current to the stator windings, the control apparatus comprising:
    an angular error calculation device for calculating a sine value and a cosine value of an angular difference between an estimated rotation angle with respect to the rotation angle of the rotor and an actual rotation angle, based on a line voltage that is a difference between phase voltages of the plurality of phases on an input side of the stator winding and phase currents of the plurality of phases; and
    an observer for calculating the rotation angle of the rotor based on the sine value and the cosine value of the angular difference.

2. The control apparatus for a brushless DC motor according to claim 1, wherein the angular error calculation device calculates a sine component and a cosine component of an induced voltage constituted by the sine value and the cosine value of the angular difference, and comprises:
    an angular velocity state function calculation device for calculating a state function in proportion to an angular velocity of the rotor based on the sine component and the cosine component of the induced voltage; and
    a normalization device for dividing the sine component of the induced voltage by the state function in proportion to the angular velocity of the rotor.

3. The control apparatus for a brushless DC motor according to claim 1, wherein the angular error calculation device calculates the sine component and the cosine component of the induced voltage constituted by the sine value and the cosine value of the angular difference, and comprises:
    a revolution speed measuring device for measuring the revolution speed of the brushless DC motor;
    an angular velocity calculation device for calculating the angular velocity of the rotor based on the revolution speed of the brushless DC motor; and
    a normalization device for dividing the sine component of the induced voltage by the angular velocity of the rotor.

4. The control apparatus for a brushless DC motor according to claim 1, wherein the angular error calculation device calculates the sine component and the cosine component of the induced voltage constituted by the sine value and the cosine value of the angular difference, and comprises:
    a coefficient acting device for causing a predetermined coefficient according to the estimated rotation angle to act on the sine component and the cosine component of the induced voltage; and
    a phase current differential value calculation device for calculating a differential value of the phase current, and the sine value and the cosine value of the angular difference is calculated based on Formula (1), $$\frac{2}{3}\begin{bmatrix} \cos\hat{\theta} & -\sin(\hat{\theta}+\frac{\pi}{6}) \\ \sin\hat{\theta} & \cos(\hat{\theta}+\frac{\pi}{6}) \end{bmatrix} \tag{1}$$

$$\left\{ \begin{bmatrix} V_1 \\ V_2 \end{bmatrix} - r \begin{bmatrix} 2 & 1 \\ 1 & 2 \end{bmatrix} \begin{bmatrix} I_1 \\ I_2 \end{bmatrix} - (l-m) \begin{bmatrix} 2 & 1 \\ 1 & 2 \end{bmatrix} \frac{d}{dt} \begin{bmatrix} I_1 \\ I_2 \end{bmatrix} \right\} \approx$$

$$\omega Ke \begin{bmatrix} \sin\theta e \\ \cos\theta e \end{bmatrix} \equiv \begin{bmatrix} Vs \\ Vc \end{bmatrix}$$

where r is a phase resistance; $V_1$, a first line voltage; $V_2$; a second line voltage; $I_1$, a first phase current; $I_2$, a second phase current; l, a self inductance; m, a mutual inductance; θ^, an estimated rotation angle; θe, an angular difference between the estimated rotation angle and an actual rotation angle; ω, a rotational angular velocity of the rotor; Ke, an induced voltage constant; Vs, a sine component of the induced voltage; and Vc; a cosine component of the induced voltage.

5. The control apparatus for a brushless DC motor according to claim 4, wherein the phase current differential value calculation device calculates, by a least squares method, variations of current measured values per unit time at past predetermined times with respect to at least three of the current measured values of the phase currents that form time-series data, and comprises:
    a phase voltage correction device for correcting a time delay relating to the past predetermined times with respect to the phase voltages of the plurality of phases for calculating the line voltage; and
    a control angle correction device for correcting a time delay relating to an appropriate past time with respect to a control angle relating to the rotation angle of the rotor used when the phase currents of the plurality of phases are converted to a d-axis current and a q-axis current on d-q coordinates that form rotating orthogonal coordinates, and feedback control is performed so that a difference between a command value and a measured value of each current on the d-q coordinates becomes zero.

6. The control apparatus for a brushless DC motor according to claim 1, wherein the current passage switching device includes a bridge circuit with the plurality of switching elements connected by bridges, and
    the control apparatus further comprises a dead time correction device for correcting the phase voltages of the plurality of phases for calculating the line voltage, based on a dead time in which two of the switching elements connected in series for each phase in the bridge circuit are set to an off state, and polarities of the phase currents.

7. The control apparatus for a brushless DC motor according to claim 1, wherein the observer comprises an angular difference correction device for correcting the angular difference when the cosine value of the angular difference is negative.

8. The control apparatus for a brushless DC motor according to claim 1, wherein the observer comprises an angular difference correction device for correcting the angular difference according to a magnitude relation of absolute values of the sine value and the cosine value of the angular difference.

9. A control method for a brushless DC motor that rotatably drives the brushless DC motor including a rotor having a permanent magnet, and a stator having stator windings of a plurality of phases that generate a rotating magnetic field for rotating the rotor, the control method comprising the steps of:
    rotating the DC motor by performing successive commutation of current to the stator windings;
    calculating a sine value and a cosine value of an angular difference between an estimated rotation angle with respect to the rotation angle of the rotor and an actual rotation angle, based on a line voltage that is a difference between phase voltages of the plurality of phases on an input side of the stator winding and phase currents of the plurality of phases; and
    calculating the rotation angle of the rotor based on the sine value and the cosine value of the angular difference.

10. The control method for a brushless DC motor according to claim 9, further comprising the steps of:
    calculating a sine component and a cosine component of an induced voltage constituted by the sine value and the cosine value of the angular difference;
    calculating a state function in proportion to an angular velocity of the rotor based on the sine component and the cosine component of the induced voltage; and
    dividing the sine component of the induced voltage by the state function in proportion to the angular velocity of the rotor so as to be normalized.

11. The control method for a brushless DC motor according to claim 9, further comprising the steps of:
    calculating a sine component and a cosine component of an induced voltage constituted by the sine value and the cosine value of the angular difference;
    measuring the revolution speed of the brushless DC motor;
    calculating the angular velocity of the rotor based on the revolution speed of the brushless DC motor; and
    dividing the sine component of the induced voltage by the state function in proportion to the angular velocity of the rotor so as to be normalized.

* * * * *